(12) United States Patent
Kothari et al.

(10) Patent No.: US 10,558,426 B2
(45) Date of Patent: Feb. 11, 2020

(54) GRAPHICAL USER INTERFACE RENDERING MANAGEMENT BY VOICE-DRIVEN COMPUTING INFRASTRUCTURE

(71) Applicant: Google LLC, Mountain View, CA (US)

(72) Inventors: Anshul Kothari, Cupertino, CA (US); Gaurav Bhaya, Sunnyvale, CA (US); Tarun Jain, Los Altos, CA (US)

(73) Assignee: Google LLC, Mountain View, CA (US)

( * ) Notice: Subject to any disclaimer, the term of this patent is extended or adjusted under 35 U.S.C. 154(b) by 2 days.

(21) Appl. No.: 15/836,746

(22) Filed: Dec. 8, 2017

(65) Prior Publication Data

US 2019/0179608 A1    Jun. 13, 2019

(51) Int. Cl.

| G06F 3/16 | (2006.01) |
|---|---|
| G10L 15/18 | (2013.01) |
| G06F 16/9535 | (2019.01) |
| G10L 15/26 | (2006.01) |
| G06F 16/23 | (2019.01) |
| G10L 15/22 | (2006.01) |

(Continued)

(52) U.S. Cl.
CPC .............. G06F 3/167 (2013.01); G06F 9/451 (2018.02); G06F 9/453 (2018.02); G06F 16/2365 (2019.01); G06F 16/3329 (2019.01); G06F 16/9535 (2019.01); G10L 15/1815 (2013.01); G10L 15/1822 (2013.01); G10L 15/22 (2013.01); G10L 15/265 (2013.01); G06N 20/00 (2019.01); H04L 51/02 (2013.01); H04L 67/20 (2013.01)

(58) Field of Classification Search
CPC .. G06F 3/167; G06F 16/9535; G06F 16/2365; G10L 15/1815; G10L 15/1822; G10L 15/265

See application file for complete search history.

(56) References Cited

U.S. PATENT DOCUMENTS

| 2007/0198339 A1 | 8/2007 | Shen et al. |
| 2009/0030800 A1 | 1/2009 | Grois |

(Continued)

OTHER PUBLICATIONS

"Walmart and Google to offer voice-enabled shopping", BBC News, Aug. 23, 2017 (10 pages).

(Continued)

*Primary Examiner* — Seth A Silverman
(74) *Attorney, Agent, or Firm* — Foley & Lardner LLP; James De Vellis

(57) ABSTRACT

Managing rendering of a graphical user interface is provided. A system receives data packets comprising an input audio signal. The system determines an application identifier and query. The system provides the query to the application to cause the application to generate a second query for transmission to a third-party server, and identify responses to the query. The system intercepts the responses, and generates a keyword based on the responses. The system selects a digital component using the keyword, executes a deduplication process, and determines to add the digital component to the responses. The system constructs a display output using a graphical user interface template that integrates the plurality of responses generated by the application with the digital component, and provides the display output to the computing device for rendering.

20 Claims, 5 Drawing Sheets

(51) Int. Cl.
    *G06F 9/451*     (2018.01)
    *G06F 16/332*     (2019.01)
    *H04L 12/58*     (2006.01)
    *H04L 29/08*     (2006.01)
    *G06N 20/00*     (2019.01)

(56) References Cited

U.S. PATENT DOCUMENTS

| | | | |
|---|---|---|---|
| 2011/0208775 A1* | 8/2011 | Brette | G06F 16/951 |
| | | | 707/769 |
| 2014/0222436 A1 | 8/2014 | Binder et al. | |
| 2014/0244266 A1 | 8/2014 | Brown et al. | |
| 2017/0092278 A1 | 3/2017 | Evermann et al. | |
| 2017/0110130 A1 | 4/2017 | Sharifi et al. | |
| 2017/0110144 A1 | 4/2017 | Sharifi et al. | |
| 2017/0132019 A1 | 5/2017 | Karashchuk et al. | |
| 2017/0132331 A1* | 5/2017 | Pepakayala | H04W 4/60 |
| 2017/0177600 A1* | 6/2017 | Zhang | G06F 3/167 |
| 2017/0316085 A1* | 11/2017 | Gupta | G06F 16/243 |
| 2017/0358301 A1 | 12/2017 | Raitio et al. | |

OTHER PUBLICATIONS

Abrams, Help users find, interact & re-engage with your app on the Google Assistant, Google Developers Blog, Nov. 15, 2017, 16 pages.
Albrecht, "Alexa, How Can You Be Used in Restaurants?", the spoon, Dec. 10, 2017, 6 pages.
Amazon, "Echo Look | Hands-Free Camera and Style Assistant", reprinted from https://www.amazon.com/gp/product/B0186JAEWK?ref%5F=cm%5Fsw%5Fr%5Ffa%5Fdp%5Ft2%5FC5oazbJTKCB18&pldnSite=1 on Aug. 22, 2017 (7 pages).
Barr, "AWS DeepLens—Get Hands-On Experience with Deep Learning With Our New Video Camera", AWS News Blog, Nov. 29, 2017, 11 pages.
Broussard, Mitchel, "Chatbot-Like Siri Patent Includes Intelligent Image, Video, and Audio Recognition within Messages", MacRumors, May 11, 2017 (7 pages).
Buckland et al., "Amazon's Alexa Takes Open-Source Route to Beat Google Into Cars", Bloomberg, Feb. 27, 2018, 6 pages.
Chen, Lulu Yilun, "Alibaba Challenges Google, Amazon With New Echo-Like Device", Bloomberg Technology, Jul. 5, 2017 (3 pages).
Clover, Juli, "Amazon and Google Want to Turn Their Smart Home Speakers Into Telephone Replacements", MacRumors, Feb. 15, 2017 (5 pages).
Coberly, "Apple patent filing reveals potential whispering Siri functionality", Techspot, Dec. 14, 2017, 4 pages.
Collins, et al., "Can Twitter Save Itself?", cnet, Apr. 26, 2017, reprinted from https://www.cnet.com/news/twitter-q1-2017-earnings/ on Aug. 22, 2017 (2 pages).
Crist, Ry, "Logitech Harmony's Alexa Skill just got a whole lot better", cnet, Jul. 13, 2017 (2 pages).
Estes, "Amazon's Newest Gadget Is a Tablet That's Also an Echo", Gizmodo, Sep. 19, 2017, 3 pages.
Foghorn Labs, 10 Tips to Improve the Performance of Google Product Listing Ads, printed from Internet address: http://www.foghornlabs.com/2012/11/21/product-listing-ads-best-practices/, on Mar. 18, 2013, 5 pages.
Forrest, Conner, "Essential Home wants to be bridge between Amazon's Alexa, Apple's Siri, and Google Assistant", TechRepublic, May 31, 2017 (10 pages).
Foxx, Chris, "Apple reveals HomePod smart speaker", BBC News, Jun. 5, 2017 (6 pages).
Gebhart, Andrew, "Google Assistant is spreading, but it needs its own Echo Dot", cnet, May 20, 2017 (7 pages).
Gebhart, Andrew, "Google Home to the Amazon Echo: 'Anything you can do . . . '", cnet, May 18, 2017 (7 pages).
Gibbs, Samuel, "Your Facebook Messenger app is about to be filled with ads", The Guardian, Jul. 12, 2017 (3 pages).

Golgowski, Nina, "This Burger King Ad Is Trying to Control Your Google Home Device", Huffpost, Apr. 12, 2017 (7 pages).
Google Developers, "GoogleAssistant SDK" reprinted from https://developers.google.com/assistant/sdk/ on Aug. 22, 2017 (4 pages).
Google Inc., Products Feed Specification, printed from Internet address: http://www.support.google.com/merchants/bin/answer.py?hl=en&answer=188494#US, on Mar. 18, 2013, 6 pages.
Google Inc., Supported File Formats, printed from Internet address: http://www.support.google.com/merchants/bin/answer.py?hl=en&answer=160567, on Mar. 18, 2013, 1 page.
Gurman, et al., "Apple Is Manufacturing a Siri Speaker to Outdo Google and Amazon", Bloomberg, May 31, 2017 (5 pages).
Hardwick, Tim, "Facebook Smart Speaker Coming Next Year With 15-inch Touch Panel", MacRumors, Jul. 25, 2017 (5 pages).
Heater, "Amazon Alexa devices can finally tell voices apart", TechCrunch, Oct. 11, 2017, 6 pages.
Johnston, "Amazon Whirlwind: New Echo, Plus, Spot, Connect, Fire TV Take the Stage", Twice, Sep. 27, 2017, 4 pages.
Kelion, "Amazon revamps Echo smart speaker family", BBC News, Sep. 27, 2017, 11 pages.
Kelion, Leo, "Amazon's race to make Alexa smarter", BBC News, Jul. 28, 2017 (8 pages).
Koetsier, John, "Ads on Amazon Echo: Wendy's, ESPN, and Progressive Among Brands Testing", Forbes, May 11, 2017 (2 pages).
Krishna, "Jim Beam's smart decanter will pour you a shot when you ask", engadget, Nov. 29, 2017, 3 pages.
Lacy, "Improving search and advertising are the next frontiers for voice-activated devices", TechCrunch, Dec. 20, 2017, 13 pages.
Larson, Selena, "Google Home now recognizes your individual voice", CNN Money, San Francisco, California, Apr. 20, 2017 (3 pages).
Lee, Take Two for Samsung's troubled Bixby assistant, BBC News, Oct. 19, 2017, 6 pages.
Lee, Dave, "The five big announcements from Google I/O", BBC News, May 18, 2017 (9 pages).
Lund, Pamela, Mastering Google Product Feeds and Product Listing Ads $2013 Part 1, found at http://www.blueglass.com/blog/mastering-google-product-feeds-and-product-listing-ads-part-1/#comments, Dec. 28, 2013, 17 pages.
Nieva, Richard, "Google Home and eBay can tell you how much that's worth", cnet, Mar. 8, 2017 (3 pages).
Novet, et al., "Amazon is getting ready to bring Alexa to work", CNBC, Nov. 29, 2017, 4 pages.
Palladino, "Garmin teamed up with Amazon to make a tiny Echo Dot for your car", ars Technica, Oct. 17, 2017, 2 pages.
Patently Apple, "Apple Patent Reveals a New Security Feature Coming to Siri", Apr. 4, 2017, reprinted from http://www.patentlyapple.com/patently-apple/2017/04/apple-patent-reveals-a-new-security-feature-coming-to-siri.html, on Aug. 22, 2017 (6 pages).
Patently Mobile, "The Patent behind Google Home's new Feature of Understanding Different Voices in the Home Surfaced Today", Apr. 20, 2017, reprinted from http://www.patentlymobile.com/2017/04/the-patent-behind-google-homes-new-feature-of-understanding-different-voices-in-the-home-surfaced-today.html, on Aug. 22, 2017 (3 pages).
Perez, "Alexa's 'Routines' will combine smart home control with other actions, like delivering your news and weather", TechCrunch, Sep. 28, 2017, 10 pages.
Perez, Sarah, "The first ad network for Alexa Skills shuts down following Amazon's policy changes", Tech Crunch, Jun. 15, 2017 (6 pages).
Porter, Jon, "Amazon Echo Show release date, price, news and features", Techradar, Jun. 26, 2017 (14 pages).
Pringle, "'I'm sorry to hear that': Why training Siri to be a therapist won't be easy", CBC News, Sep. 24, 2017, 3 pages.
Purcher, Jack, Today Google Home's Virtual Assistant can learn its Owner's voice for Security Reasons like Apple's Patent Pending Idea, Apr. 20, 2017, 4 pages.
Sablich, Justin, "Planning a Trip With the Help of Google Home", New York Times, May 31, 2017 (6 pages).
Seifert, Dan, "Samsung's new virtual assistant will make using your phone easier", The Verge, Mar. 20, 2017 (6 pages).

(56) References Cited

OTHER PUBLICATIONS

Sherr, Ian, "IBM built a voice assistant for cybersecurity", cnet, Feb. 13, 2017 (2 pages).
Siegal, Daniel, "IP Attys Load Up Apps' Legal Challenges At 'Silicon Beach'", Law360, Los Angeles, California, Feb. 2, 2017 (4 pages).
Unknown Author, "'Dolphin' attacks fool Amazon, Google voice assistants", BBC News, Sep. 7, 2017, 8 pages.
Willens, Max, "For publishers, Amazon Alexa holds promise but not much money (yet)", Digiday, Jul. 6, 2017 (6 pages).
Gries, et al., "Data Deduplication Overview," Microsoft, May 9, 2017, 2 pages.
International Search Report and Written Opinion of the International Searching Authority on PCT/US/2018/037858 dated Oct. 5, 2018, 17 pages.

* cited by examiner

GRAPHICAL USER INTERFACE RENDERING MANAGEMENT BY VOICE-DRIVEN COMPUTING INFRASTRUCTURE

BACKGROUND

A computing device can receive data transmitted over a computer network. The device can present the data. Due to excessive data transmissions, it may be challenging to efficiently present data from multiple sources.

SUMMARY

The present disclosure is generally directed to graphical user interface rendering management by voice-driven computing infrastructure. Responses or output from multiple, disparate sources can be received. Each source can provide output in a format. It may be inefficient or processor intensive to execute multiple renderings of output from different sources.

At least one aspect is directed to a system to manage rendering of a graphical user interface. The system can include a data processing system having one or more processors and memory. The data processing system can execute a natural language processor component, an interface, an output merger component, and a content selector component. The data processing system can receive, via the interface, data packets comprising an input audio signal detected by a sensor of a computing device. The data processing system can determine, from the input audio signal, an application identifier and a query to be input into an application corresponding to the application identifier. The data processing system can provide the query to the application to cause the application to generate a second query for transmission to a third-party server, and identify a plurality of responses to the query for display via the computing device. The data processing system can obtain, prior to display on the computing device and from the application, the plurality of responses identified by the application responsive to the second query transmitted to third-party server. The data processing system can parse the plurality of responses to generate a keyword based on the plurality of responses. The data processing system can execute, responsive to generation of the keyword, a real-time content selection process with the keyword generated based on the plurality of responses obtained from the application. The data processing system can identify, based on the real-time content selection process, a digital component provided by a content provider device. The data processing system can execute a deduplication process with the digital component and the plurality of responses generated by the application. The data processing system can determine, responsive to the deduplication process executed with the digital component and the plurality of responses generated by the application, to add the digital component to the plurality of responses. The data processing system can retrieve, for the application, a graphical user interface template defining a font, color, and layout to render the plurality of responses. The data processing system can construct a display output using the graphical user interface template that integrates the plurality of responses generated by the application with the digital component identified based on the real-time content selection process. The data processing system can provide the display output to the computing device to cause the computing device to render the display output for display via a display device communicatively coupled to the computing device.

At least one aspect is directed to a method of managing rendering of a graphical user interface. The method can be performed by a data processing system having one or more processors and memory. The method can include the data processing system receiving, via an interface, data packets comprising an input audio signal detected by a sensor of a computing device. The method can include the data processing system determining, by the data processing system from the input audio signal, an application identifier and a query to be input into an application corresponding to the application identifier. The method can include the data processing system providing the query to the application to cause the application to generate a second query for transmission to a third-party server, and identify a plurality of responses to the query for display via the computing device. The method can include the data processing system obtaining, prior to display on the computing device and from the application, the plurality of responses identified by the application responsive to the second query transmitted to third-party server. The method can include the data processing system parsing the plurality of responses to generate a keyword based on the plurality of responses. The method can include the data processing system executing, responsive to generation of the keyword, a real-time content selection process with the keyword generated based on the plurality of responses obtained from the application. The method can include the data processing system identifying, based on the real-time content selection process, a digital component provided by a content provider device. The method can include the data processing system executing a deduplication process with the digital component and the plurality of responses generated by the application. The method can include the data processing system determining, responsive to the deduplication process executed with the digital component and the plurality of responses generated by the application, to add the digital component to the plurality of responses. The method can include the data processing system retrieving, for the application, a graphical user interface template defining a font, color, and layout to render the plurality of responses. The method can include the data processing system constructing a display output using the graphical user interface template that integrates the plurality of responses generated by the application with the digital component identified based on the real-time content selection process. The method can include the data processing system providing the display output to the computing device to cause the computing device to render the display output for display via a display device communicatively coupled to the computing device.

At least one aspect is directed to a digital assistant device. The digital assistant device can include a display device, a graphics driver, a sensor, and a pre-processor component. The sensor can detect an input audio signal. The pre-processor component can be coupled to the display device, the graphics driver, and the sensor. The pre-processor component can filter the input audio signal to create a filtered input audio signal. The pre-processor component can convert the filtered input audio signal to data packets. The pre-processor component can transmit the data packets to a data processing system. The data processing system can have one or more processors and memory that execute a natural language processor component, an interface, an output merger component, and a content selector component. The data processing system can receive, via the interface, data packets comprising an input audio signal detected by a sensor of a computing device. The data processing system can determine, from the input audio signal, an application identifier and a query to be input into an application corresponding to the application identifier. The data processing system can provide the query to the application to cause the application to generate a second query for transmission to a third-party server, and identify a plurality of responses to the query for display via the computing device. The data processing system can obtain, prior to display on the computing device and from the application, the plurality of responses identified by the application responsive to the second query transmitted to third-party server. The data processing system can parse the plurality of responses to generate a keyword based on the plurality of responses. The data processing system can execute, responsive to generation of the keyword, a real-time content selection process with the keyword generated based on the plurality of responses obtained from the application. The data processing system can identify, based on the real-time content selection process, a digital component provided by a content provider device. The data processing system can execute a deduplication process with the digital component and the plurality of responses generated by the application. The data processing system can determine, responsive to the deduplication process executed with the digital component and the plurality of responses generated by the application, to add the digital component to the plurality of responses. The data processing system can retrieve, for the application, a graphical user interface template defining a font, color, and layout to render the plurality of responses. The data processing system can construct a display output using the graphical user interface template that integrates the plurality of responses generated by the application with the digital component identified based on the real-time content selection process. The data processing system can provide the display output to the digital assistant device to cause the digital assistant device to render the display output for display via the display device communicatively coupled to the digital assistant device. The graphics driver of the digital assistant device can render the display output to cause the display device to present a visual indication corresponding to the display output.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Following below are more detailed descriptions of various concepts related to, and implementations of, methods, apparatuses, and systems of routing packetized actions via a computer network. The various concepts introduced above and discussed in greater detail below may be implemented in any of numerous ways.

The present disclosure is generally directed to managing rendering of a graphical user interface. Responses or output from multiple, disparate sources can be received. Each source can provide output in a format. It may be inefficient or processor intensive to execute multiple renderings of output from different sources.

Systems and methods of the present solution are generally directed to integrating a digital assistant with a third-party user experience. A computing system can provide digital components from multiple sources. However, it may be challenging to efficiently present digital components from disparate sources via a single interface. Systems and methods of the present solution are directed to integrating a digital assistant with a third-party user experience. For example, the present disclosure can allow a digital assistant to integrate with a chatbot application in order to provide a user experience and interface consistent with the chatbot's interface, thereby providing the look and feel of the third party within a visual display driven by a digital assistant. A chatbot application can refer to a computer program that simulates a conversation, using audio output or display text. In some cases, the digital assistant can add content from an additional source for presentation along with the third party content. For example, a user can submit a voice query "Chatbot, suggest some restaurants nearby", and the digital assistant can respond with organic content from the chatbot plus integrated sponsored digital components.

Figure 1:
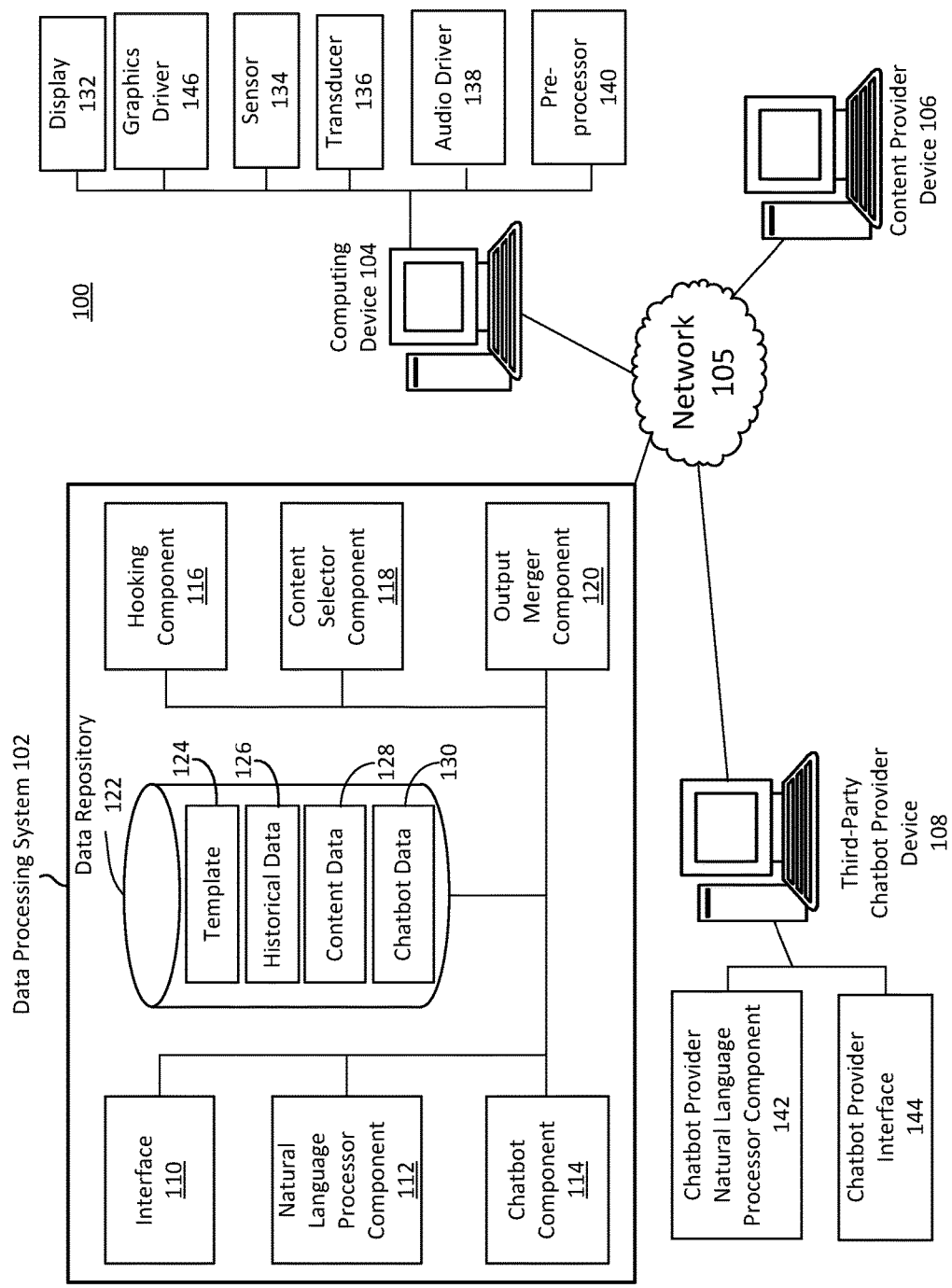
FIG. 1 is an illustration of a system to manage rendering of a graphical user interface.

FIG. 1 illustrates an example system 100 to manage rendering of a graphical user interface. The system 100 can include content selection infrastructure. The system 100 can include a data processing system 102. The data processing system 102 can communicate with one or more of a content provider computing device 106, chatbot provider device 108, or client computing device 104 via a network 105. The network 105 can include computer networks such as the Internet, local, wide, metro, or other area networks, intranets, satellite networks, and other communication networks such as voice or data mobile telephone networks. The network 105 can be used to access information resources such as web pages, web sites, domain names, or uniform resource locators that can be presented, output, rendered, or displayed on at least one computing device 104, such as a laptop, desktop, tablet, digital assistant, personal digital assistant, smartwatch, wearable device, smart phone, portable computers, or speaker. For example, via the network 105 a user of the computing device 104 can access information or data provided by a chatbot provider 108 or content provider computing device 106. The computing device 104 may or may not include a display; for example, the computing device may include limited types of user interfaces, such as a microphone and speaker. In some cases, the primary user interface of the computing device 104 may be a microphone and speaker.

The network 105 can include or constitute a display network, e.g., a subset of information resources available on the internet that are associated with a content placement or search engine results system, or that are eligible to include third party digital components as part of a digital component placement campaign. The network 105 can be used by the data processing system 102 to access information resources such as web pages, web sites, domain names, or uniform resource locators that can be presented, output, rendered, or displayed by the client computing device 104. For example, via the network 105 a user of the client computing device 104 can access information or data provided by the content provider computing device 106 or the chatbot provider computing device 108.

The network 105 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. The network 105 may include a wireless link, such as an infrared channel or satellite band. The topology of the network 105 may include a bus, star, or ring network topology. The network may include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). Different types of data may be transmitted via different protocols, or the same types of data may be transmitted via different protocols.

The system 100 can include at least one data processing system 102. The data processing system 102 can include at least one logic device such as a computing device having a processor to communicate via the network 105, for example with the computing device 104, the content provider device 106 (content provider computing device 106), or the chatbot provider device 108 (or chatbot provider 108). The data processing system 102 can include at least one computation resource, server, processor or memory. For example, the data processing system 102 can include a plurality of computation resources or servers located in at least one data center. The data processing system 102 can include multiple, logically-grouped servers and facilitate distributed computing techniques. The logical group of servers may be referred to as a data center, server farm or a machine farm. The servers can also be geographically dispersed. A data center or machine farm may be administered as a single entity, or the machine farm can include a plurality of machine farms. The servers within each machine farm can be heterogeneous—one or more of the servers or machines can operate according to one or more type of operating system platform.

Servers in the machine farm can be stored in high-density rack systems, along with associated storage systems, and located in an enterprise data center. For example, consolidating the servers in this way may improve system manageability, data security, the physical security of the system, and system performance by locating servers and high performance storage systems on localized high performance networks. Centralization of all or some of the data processing system 102 components, including servers and storage systems, and coupling them with advanced system management tools allows more efficient use of server resources, which saves power and processing requirements and reduces bandwidth usage.

The computing device 104 can include, interface, or otherwise communicate with at least one display 132, at least one sensor 134, at least one transducer 136, at least one audio driver 138, or at least one pre-processor 140. The display 132 can include one or more hardware or software component configured to provide a visual indication or optical output, such as a light emitting diode, organic light emitting diode, liquid crystal display, laser, or display 535. The sensor 134 can include, for example, a camera, an ambient light sensor, proximity sensor, temperature sensor, accelerometer, gyroscope, motion detector, GPS sensor, location sensor, microphone, video, image detection, or touch sensor. The transducer 136 can include or be part of a speaker or a microphone. The audio driver 138 can provide a software interface to the hardware transducer 136. The audio driver can execute the audio file or other instructions provided by the data processing system 102 to control the transducer 136 to generate a corresponding acoustic wave or sound wave. The pre-processor 140 can include one or more processors (e.g., processor 510), logic array, or memory. The pre-processor 140 can detect a keyword and perform an action based on the keyword. The pre-processor 140 can filter out one or more terms or modify the terms prior to transmitting the terms to the data processing system 102 for further processing. The pre-processor 140 can convert the analog audio signals detected by the microphone into a digital audio signal, and transmit one or more data packets carrying the digital audio signal to the data processing system 102 via the network 105. In some cases, the pre-processor 140 can transmit data packets carrying some or all of the input audio signal responsive to detecting an instruction to perform such transmission. The instruction can include, for example, a trigger keyword or other keyword or approval to transmit data packets comprising the input audio signal to the data processing system 102.

The pre-processor 140 can perform a pre-filtering or pre-processing on the input audio signal to remove certain frequencies of audio. The pre-filtering can include filters such as a low-pass filter, high-pass filter or a bandpass filter. The filters can be applied in the frequency domain. The filters can be applied using a digital signal processing technique. The filter can be configured to keep frequencies that correspond to a human voice or human speech, while eliminating frequencies that fall outside the typical frequencies of human speech. For example, a bandpass filter can be configured to remove frequencies bellow a first threshold (e.g., 70 Hz, 75 Hz, 80 Hz, 85 Hz, 90 Hz, 95 Hz, 100 Hz, or 105 Hz) and above a second threshold (e.g., 200 Hz, 205 Hz, 210 Hz, 225 Hz, 235 Hz, 245 Hz, or 255 Hz). Applying a bandpass filter can reduce computing resource utilization in downstream processing. In some cases, the pre-processor 140 on the computing device 104 can apply the bandpass filter prior to transmitting the input audio signal to the data processing system 102, thereby reducing network bandwidth utilization. However, based on the computing resources available to the computing device 104 and the available network bandwidth, it may be more efficient to provide the input audio signal to the data processing system 102 to allow the data processing system 102 to perform the filtering.

The pre-processor 140 can apply additional pre-processing or pre-filtering techniques such as noise reduction techniques to reduce ambient noise levels that can interfere with natural language processor. Noise reduction techniques can improve accuracy and speed of natural language processor, thereby improving the performance of the data processing system 102 and manage rendering of a graphical user interface provided via display 132.

The client computing device 104 (or referred to as computing device 104) can be associated with an end user that enters voice queries as audio input into the client computing device 104 (via the sensor 134) and receives audio output in the form of a computer-generated voice that can be provided from the data processing system 102 (or the content provider computing device 106 or the chatbot provider computing device 108) to the client computing device 104, output from the transducer 136 (e.g., a speaker). The computer-generated voice can include recordings from a real person or computer generated language. The client computing device 104 can provide visual output via a display device 132 communicatively coupled to the computing device 104.

The client computing device 104 can be associated with an end user that provides image or video that can indicate queries as input into the client computing device 104 (via the sensor 134). The end user can receive audio output responsive to the input in the form of a computer-generated voice that can be provided from the data processing system 102 (or the content provider computing device 106 or the chatbot provider computing device 108) to the client computing device 104, output from the transducer 136 (e.g., a speaker). The end user can receive visual output responsive to the input in the form of a computer-generated graphical user interface that can be provided from the data processing system 102 (or the content provider computing device 106 or the chatbot provider computing device 108) to the client computing device 104 output to the display 132). The input detected by the one or more sensors 134 can include one or more of audio input (e.g., acoustic signal), visual input (e.g., image or video data), motion input or other input. The input (e.g., the one or more of audio, image, visual, or motion input) to the computing device 104 can be converted to a digital file and provided to the data processing system 102 for further processing or to generate actions. For example, the input (e.g., the one or more of audio, image, visual, or motion input) to the computing device 104 can trigger the selection of a computer program comprising a chatbot, trigger the generation of a query to be input to the chatbot, and the chatbot can provide output that is responsive to the query generated or corresponding to the input (e.g., the one or more of audio, image, visual, or motion input) to the computing device 104.

The computing device 104 can receive an input audio signal detected by a sensor 134 (e.g., microphone) of the computing device 104. The input audio signal can include, for example, a query, question, command, instructions, or other statement provided in a language. The input audio signal can include an identifier or name of a chatbot to which the question or query is directed. For example, the query can include the name of the chatbot followed by the query in order to instruct the data processing system 102 to input the query into the specified chatbot. For example, the input audio signal can include "Foodbot, suggest some good restaurants nearby." The input audio signal may or may not include an identifier of the chatbot.

The system 100 can include, access, or otherwise interact with at least one third-party chatbot provider device 108. The third-party chatbot provider device 108 can include one or more servers and can be referred to as a third-party chatbot server. The third-party chatbot provider device 108 can be integrated with the data processing system 102, or executed at least partially by the data processing system 102. The third-party chatbot provider device 108 can include at least one logic device such as a computing device having a processor to communicate via the network 105, for example with the computing device 104, the data processing system 102, or the content provider computing device 106. The chatbot provider device 108 can include at least one computation resource, server, processor or memory. For example, chatbot provider device 108 can include a plurality of computation resources or servers located in at least one data center. The chatbot provider device 108 can include one or more component or functionality of the data processing system 102.

The chatbot provider device 108 can include or refer to a chatbot developer, such as an entity that designs, develops, manages, or maintains computer programs that form or provide one or more chatbots. A chatbot can include a computer program that conducts a conversation via auditory, image, or textual methods. The chatbot can be designed to simulate how a human would behave as a conversational partner. Chatbots can be used in dialog systems for customer service or information acquisition. Chatbots can include or use natural language processing systems (e.g., natural language processor component 112). The chatbot can scan for keywords within an input, and then pull a reply with the most matching keywords, or the most similar wording pattern, from a database. The chatbot can be programmed with procedures that utilize pattern-matching to lookup predefined dialog data structures. The chatbot can be programmed with natural language processing techniques to identify a grammar and syntax of input, tokenize input, or otherwise process the input to determine a response.

The chatbot provider device 108 can include, interface, or otherwise communicate with at least one chatbot provider natural language processor component 142 and a chatbot provider interface 144. The chatbot provider computing device 108 can include at least one chatbot provider natural language processor (NLP) component 142 and at least one chatbot provider interface 144. The chatbot provider NLP component 142 (or other components such of the chatbot provider computing device 108) can engage with the client computing device 104 (via the data processing system 102 or bypassing the data processing system 102) to create a back-and-forth real-time voice or audio based conversation (e.g., a session) between the client computing device 104 and the chatbot provider computing device 108. The chatbot provider NLP 142 can include one or more function or feature as the NLP component 112 of the data processing system 102. For example, the chatbot provider interface 144 can receive or provide data messages to the interface 110 of the data processing system 102. The chatbot provider computing device 108 and the content provider computing device 106 can be associated with the same entity. For example, the content provider computing device 106 can create, store, or make available digital components for a chatbot, and the chatbot provider computing device 108 can establish a session with the client computing device 106 to communicate via a chatbot via the client computing device 104. The data processing system 102, via the interface 110, chatbot component 114 or other components can also establish a session with the client computing device 104, including or bypassing the chatbot provider computing device 104.

The third-party chatbot provider device 108 can refer to one or more servers of an entity that is different from the entity that administers or provides the data processing system 102. The third-party chatbot device 108 can receive computer programs for a chatbot. The third-party chatbot device 108 can provide natural language processing and other functions. The third-party chatbot device 108 can interface or communicate with the computing device 104 to provide the chatbot functionality. For example, third-party chatbot device 108 can execute or run the chatbot in order to engage in a conversion with a user of the computing device 104. The third-party chatbot device 108 can execute on a server remote from the data processing system 102 and computing device 104. In some cases, the third-party chatbot device 108 can execute at least partially on the computing device 104 (e.g., as part of pre-processor 140).

The data processing system 102 can include a content placement system having at least one computation resource or server. The data processing system 102 can include, interface, or otherwise communicate with at least one interface 110. The data processing system 102 can include, interface, or otherwise communicate with at least one natural language processor component 112. The data processing system 102 can include, interface, or otherwise communicate with at least one chatbot component 114. The data processing system 102 can include, interface, or otherwise communicate with at least one hooking component 116. The data processing system 102 can include, interface, or otherwise communicate with at least one content selector component 118. The data processing system 102 can include, interface, or otherwise communicate with at least one output merger component 120. The data processing system 102 can include, interface, or otherwise communicate with at least one data repository 122. The at least one data repository 122 can include or store, in one or more data structures or databases, templates 124, historical data 126, content data 128 or chatbot data 130. The data repository 122 can include computer data storage or memory and can store one or more templates 124, historical data 126, content data 128, or chatbot data 130 among other data. The template 124 can include information that facilitates generating display output. The template 124 can include a graphical user interface template. The graphical user interface template can define a font, a color, or a layout to generate display output, such as display output via a chatbot interface. The template 124 can be stored as a data structure, photo editor file, or style sheet, for example.

Historical data 126 can be stored in one or more data structures. The historical data 126 can include historical network activity associated with the computing device 104, identifiers of chatbots utilized by computing device 104, a configuration of the computing device 104, device functionality, preferences, or other information associated with the computing device 104 that can facilitate content selection or selecting a position among chatbot results at which to insert a digital component. Content data 130 can include, for example, content campaign information, content groups, content selection criteria, digital component objects or other information provided by a content provider computing device 106 or obtained or determined by the data processing system to facilitate content selection. The content data 130 can include, for example, historical performance of a content campaign. The content data 128 can include digital components for audio output, display output or associated metadata, as well as input audio messages that can be part of one or more communication sessions with the client computing device 104. A digital component (or digital component object) can include, for example, a content item, an online document, audio, images, video, multimedia content, or sponsored content.

The chatbot data 130 can include identifiers for chatbots, information about types of chatbots (e.g., category, restrictions, or topics). Chatbot data 130 can be stored in a data structure and be indexed based on an identifier of the chatbot. The chatbot data 130 can be further indexed base on an identifier associated with the computing device 104. The data repository 122 can include one or more local or distributed databases, and can include a database management system.

The interface 110, natural language processor component 112, chatbot component 114, hooking component 116, content selector component 118, or output merger component 120 can each include at least one processing unit or other logic device such as programmable logic array engine, or module configured to communicate with the database repository or database 122. The interface 110, natural language processor component 112, chatbot component 114, hooking component 116, content selector component 118, output merger component 120 and data repository 122 can be separate components, a single component, or part of the data processing system 102. The system 100 and its components, such as a data processing system 102, can include hardware elements, such as one or more processors, logic devices, or circuits.

The data processing system 102 can obtain anonymous computer network activity information associated with a plurality of computing devices 104. A user of a computing device 104 can affirmatively authorize the data processing system 102 to obtain network activity information corresponding to the user's computing device 104. For example, the data processing system 102 can prompt the user of the computing device 104 for consent to obtain one or more types of network activity information. The identity of the user of the computing device 104 can remain anonymous and the computing device 104 can be associated with a unique identifier (e.g., a unique identifier for the user or the computing device provided by the data processing system or a user of the computing device). The data processing system can associate each observation with a corresponding unique identifier.

A content provider computing device 106 can provide audio, visual, or multimedia based digital components for presentation by the client computing device 104 as an audio output digital component or visual output digital component. The digital component can be or include a digital component. The digital component can be or include a digital object. The digital component can include a brand name or company name of a good or service. The digital component can be configured for a parametrically driven text to speech technique. The digital component can be configured for text-to-speech (TTS) implementations that convert normal language text into speech. The digital component can be input to an application programming interface that utilizes a speech-synthesis capability to synthesize text into natural-sounding speech in a variety of languages, accents, and voices. The digital component can be coded as plain text or a speech synthesis markup language (SSML). SSML can include parameters that can be set to control aspects of speech, such as pronunciation, volume, pitch, or rate that can form an acoustic fingerprint or native voice.

The content provider computing device 106 can provide content selection criteria for the digital component, such as a value, keyword, concept, or other metadata or information to facilitate a content selection process. The content provider computing device 106 can also provide audio based digital components (or other digital components) to the data processing system 102 where they can be stored in the data repository 122. The data processing system 102 can select the audio digital components (or digital components configured for a parametrically driven text, image, or video to speech technique) and provide (or instruct the content provider computing device 106 to provide) the audio digital components to the client computing device 104. The audio based digital components can be exclusively audio or can be combined with text, image, or video data.

The content provider computing device 106 can provide the digital component to the data processing system 102 for storage in the data repository 122 in the content data data structure 128. The data processing system 102 can retrieve the digital component responsive to a request for content or otherwise determining to provide the digital component.

The content provider computing device 106 can establish an electronic content campaign. The electronic content campaign can be stored as content data 128 in data repository 122. An electronic content campaign can refer to one or more content groups that correspond to a common theme. A content campaign can include a hierarchical data structure that includes content groups, digital component data objects (e.g., digital components or digital objects), and content selection criteria. To create a content campaign, content provider computing device 106 can specify values for campaign level parameters of the content campaign. The campaign level parameters can include, for example, a campaign name, a preferred content network for placing digital component objects, a value of resources to be used for the content campaign, start and end dates for the content campaign, a duration for the content campaign, a schedule for digital component object placements, language, geographical locations, type of computing devices on which to provide digital component objects. In some cases, an impression can refer to when a digital component object is fetched from its source (e.g., data processing system 102 or content provider computing device 106), and is countable. In some cases, due to the possibility of click fraud, robotic activity can be filtered and excluded, as an impression. Thus, in some cases, an impression can refer to a measurement of responses from a Web server to a page request from a browser, which is filtered from robotic activity and error codes, and is recorded at a point as close as possible to opportunity to render the digital component object for display on the computing device 104. In some cases, an impression can refer to a viewable or audible impression; e.g., the digital component object or digital component is at least partially (e.g., 20%, 30%, 30%, 40%, 50%, 60%, 70%, or more viewable on a display device of the client computing device 104, or audible via a speaker 136 of the computing device 104. A click or selection can refer to a user interaction with the digital component object, such as a voice response to an audible impression, a mouse-click, touch interaction, gesture, shake, audio interaction, or keyboard click. A conversion can refer to a user taking a desired action with respect to the digital component objection; e.g., purchasing a product or service, completing a survey, visiting a physical store corresponding to the digital component, or completing an electronic transaction.

The content provider computing device 106 can further establish one or more content groups for a content campaign. A content group includes one or more digital component objects and corresponding content selection criteria, such as keywords, words, terms, phrases, geographic locations, type of computing device, time of day, interest, topic, or vertical. Content groups under the same content campaign can share the same campaign level parameters, but may have tailored specifications for content group level parameters, such as keywords, negative keywords (e.g., that block placement of the digital component in the presence of the negative keyword on main content), bids for keywords, or parameters associated with the bid or content campaign.

To create a new content group, the content provider computing device 106 can provide values for the content group level parameters of the content group. The content group level parameters include, for example, a content group name or content group theme, and bids for different content placement opportunities (e.g., automatic placement or managed placement) or outcomes (e.g., clicks, impressions, or conversions). A content group name or content group theme can be one or more terms that the content provider computing device 106 can use to capture a topic or subject matter for which digital component objects of the content group is to be selected for display. For example, a food and beverage company can create a different content group for each brand of food or beverage it carries, and may further create a different content group for each model of vehicle it carries. Examples of the content group themes that the food and beverage company can use include, for example, "Brand A cola", "Brand B ginger ale," "Brand C orange juice," "Brand D sports drink," or "Brand E purified water." An example content campaign theme can be "soda" and include content groups for both "Brand A cola" and "Brand B ginger ale", for example. The digital component (or digital component object or digital component) can include "Brand A", "Brand B", "Brand C", "Brand D" or "Brand E". The digital component object or digital component can refer to the digital component configured for a parametrically driven text to speech technique.

The content provider computing device 106 can provide one or more keywords and digital component objects to each content group. Keywords can include terms that are relevant to the product or services of associated with or identified by the digital component objects. A keyword can include one or more terms or phrases. For example, the food and beverage company can include "soda," "cola," "soft drink," as keywords for a content group or content campaign that can be descriptive of the goods or services the brand provides. In some cases, negative keywords can be specified by the content provider to avoid, prevent, block, or disable content placement on certain terms or keywords. The content provider can specify a type of matching, such as exact match, phrase match, or broad match, used to select digital component objects.

The content provider computing device 106 can provide one or more keywords to be used by the data processing system 102 to select a digital component object provided by the content provider computing device 106. The content provider computing device 106 can identify one or more keywords to bid on, and further provide bid amounts for various keywords. The content provider computing device 106 can provide additional content selection criteria to be used by the data processing system 102 to select digital component objects. Multiple content providers 106 can bid on the same or different keywords, and the data processing system 102 can run a content selection process or ad auction responsive to receiving an indication of a keyword of an electronic message.

The content provider computing device 106 can provide one or more digital component objects for selection by the data processing system 102. The data processing system 102 (e.g., via content selector component 118) can select the digital component objects when a content placement opportunity becomes available that matches the resource allocation, content schedule, maximum bids, keywords, and other selection criteria specified for the content group. Different types of digital component objects can be included in a content group, such as a voice digital component, audio digital component, a text digital component, an image digital component, video digital component, multimedia digital component, or digital component link. Upon selecting a digital component, the data processing system 102 can transmit the digital component object for rendering on a computing device 104 or display device of the computing device 104. Rendering can include displaying the digital component on a display device, or playing the digital component via a speaker of the computing device 104. The data processing system 102 can provide instructions to a computing device 104 or chatbot component 114, or third-party chatbot provider device 108 to present the digital component object. The data processing system 102 can instruct the computing device 104, display 132, or an audio driver 138 of the computing device 104, to generate audio signals, acoustic waves, or visual output.

The data processing system 102 can include an interface component 110 designed, configured, constructed, or operational to receive and transmit information using, for example, data packets. The interface 110 can receive and transmit information using one or more protocols, such as a network protocol. The interface 110 can include a hardware interface, software interface, wired interface, or wireless interface. The interface 110 can facilitate translating or formatting data from one format to another format. For example, the interface 110 can include an application programming interface that includes definitions for communicating between various components, such as software components.

The data processing system 102 can include an application, script or program installed at the client computing device 104, such as an application to communicate input audio signals to the interface 110 of the data processing system 102 and to drive components of the client computing device to render output audio signals or visual output. The data processing system 102 can receive data packets, a digital file, or other signal that includes or identifies an audio input signal (or input audio signal). The computing device 104 can detect the audio signal via the transducer 136, and convert the analog audio signal to a digital file via an analog-to-digital converter. For example, the audio driver 138 can include an analog-to-digital converter component. In some cases, the pre-processor component 140 can convert the audio signals to a digital file that can be transmitted via data packets over network 105.

The data processing system 102 can execute or run the NLP component 112 to receive or obtain the data packets including the input audio signal detected by the sensor 134 of the computing device 104. The data packets can provide a digital file. The NLP component 112 can receive or obtain the digital file or data packets comprising the audio signal and parse the audio signal. For example, the NLP component 112 can provide for interactions between a human and a computer. The NLP component 112 can be configured with techniques for understanding natural language and allowing the data processing system 102 to derive meaning from human or natural language input. The NLP component 112 can include or be configured with technique based on machine learning, such as statistical machine learning. The NLP component 112 can utilize decision trees, statistical models, or probabilistic models to parse the input audio signal. The NLP component 112 can perform, for example, functions such as named entity recognition (e.g., given a stream of text, determine which items in the text map to proper names, such as people or places, and what the type of each such name is, such as person, location, or organization), natural language generation (e.g., convert information from computer databases or semantic intents into understandable human language), natural language understanding (e.g., convert text into more formal representations such as first-order logic structures that a computer module can manipulate), machine translation (e.g., automatically translate text from one human language to another), morphological segmentation (e.g., separating words into individual morphemes and identify the class of the morphemes, which can be challenging based on the complexity of the morphology or structure of the words of the language being considered), question answering (e.g., determining an answer to a human-language question, which can be specific or open-ended), semantic processing (e.g., processing that can occur after identifying a word and encoding its meaning in order to relate the identified word to other words with similar meanings).

The NLP component 112 can convert the audio input signal into recognized text by comparing the input signal against a stored, representative set of audio waveforms (e.g., in the data repository 122) and choosing the closest matches. The set of audio waveforms can be stored in data repository 122 or other database accessible to the data processing system 102. The representative waveforms are generated across a large set of users, and then may be augmented with speech samples from the user. After the audio signal is converted into recognized text, the NLP component 112 matches the text to words that are associated, for example via training across users or through manual specification, with actions that the data processing system 102 can serve. The NLP component 112 can convert image or video input to text or digital files. The NLP component 112 can process, analyze or interpret image or video input to perform actions, generate requests, or select or identify data structures.

The audio input signal can be detected by the sensor 134 or transducer 136 (e.g., a microphone) of the client computing device 104. Via the transducer 136, the audio driver 138, or other components the client computing device 104 can provide the audio input signal to the data processing system 102 (e.g., via the network 105) where it can be received (e.g., by the interface 110) as a digital file or digital format and provided to the NLP component 112 or stored in the data repository 122. In some cases, the data processing system 102 can receive image or video input signals, in addition to, or instead of, input acoustic signals. The data processing system 102 can process the image or video input signals using, for example, image interpretation techniques, computer vision, a machine learning engine, or other techniques to recognize or interpret the image or video to convert the image or video to a digital file. The one or more image interpretation techniques, computer vision techniques, machine learning techniques can be collectively referred to as imaging techniques. The data processing system 102 (e.g., the NLP component 112) can be configured with the imaging techniques, in addition to, or instead of, audio processing techniques.

The NLP component 112 can obtain the input audio signal. From the input audio signal, the NLP component 112 can identify at least one request or at least one trigger keyword corresponding to the request. The request can indicate intent or subject matter of the input audio signal. The trigger keyword can indicate a type of action likely to be taken. For example, the NLP component 112 can parse the input audio signal to identify at least one request to leave home for the evening to attend dinner and a movie. The trigger keyword can include at least one word, phrase, root or partial word, or derivative indicating an action to be taken. For example, the trigger keyword "go" or "to go to" from the input audio signal can indicate a need for transport. In this example, the input audio signal (or the identified request) does not directly express an intent for transport, however the trigger keyword indicates that transport is an ancillary action to at least one other action that is indicated by the request.

The NLP component 112 can parse the input audio signal to identify, determine, retrieve, or otherwise obtain the request and the trigger keyword. For instance, the NLP component 112 can apply a semantic processing technique to the input audio signal to identify the trigger keyword or the request. The NLP component 112 can apply the semantic processing technique to the input audio signal to identify a trigger phrase that includes one or more trigger keywords, such as a first trigger keyword and a second trigger keyword. For example, the input audio signal can include the sentence "Foodbot, suggest some good restaurants nearby." The NLP component 112 can determine that the input audio signal includes an application identifier and a query. The application identifier can refer to a chatbot identifier or name. The NLP component 112 can apply a semantic processing technique, or other natural language processing technique, to the data packets comprising the sentence to identify the application identifier "Foodbot" and the query "suggest some good restaurants nearby". The NLP component 112 can further identify multiple keywords, such as "good", "restaurants" and "nearby" that can be used to generate a query to input into the application. For example, the NLP component 112 can determine that the trigger phrase includes the trigger keyword and a plurality of additional keywords that can be used to form a query.

The NLP component 112 can filter the input audio signal to identify the application identifier and query. In some cases, the input audios signal can include a query but may not include an application identifier or name of a chatbot. For example, the data packets carrying the input audio signal can include "It would be great if I could get help finding some good restaurants nearby", in which case the NLP component 112 can filter out one or more terms as follows: "it", "would", "be", "great", "if", "I", "could", "get", or "help". By filtering out these terms, the NLP component 112 may more accurately and reliably identify the query or keywords, such as "finding" "good" "restaurants" "nearby" and determine that this is a request to launch a restaurant chatbot.

The input audio signal can include an application identifier, such as an identifier for a desired chatbot. The input audio signal can include a unique identifier of the chatbot, the name of the chatbot, or other indication as to which chatbot to launch or invoke. For example, the input audio signal can include the name of the chatbot, such as "Foodbot". The application identifier can be an alphanumeric identifier.

Thus, the data processing system 102 can receive a data packets corresponding to an input audio signal carrying voice content detected by a sensor 134 or transducer 136 of the computing device 104. The input audio signal can be converted to a digital file by an analog to digital converter (e.g., audio driver 138) of the computing device 104. The data processing system 102 can receive data packets corresponding to the digital file over network 105, and then parse the data packets or digital file to select a computer program comprising a chatbot. For example, the data processing system 102 can include a chatbot component 114 designed and constructed to select, responsive to the data packets or digital file, a computer program that includes a chatbot for execution by the data processing system 102 or computing device 104 or third-party chatbot provider device 108.

The chatbot component 114 can identify keywords, tokens, terms, concepts, or other information in the digital file. The chatbot component 114 can utilize the natural language processor component 112 to identify keywords, tokens, terms, concepts, or other information in the digital file. The natural language processor component 112 can provide the parsed keyword, token, term or concept to the chatbot component 114. The chatbot component 114 can select a chatbot that is responsive to a keyword or concept of the digital file. The chatbot component 114 can select a chatbot that maps to the application identifier provided in the input audio signal.

The data processing system 102 (e.g., via NLP component 112 or chatbot component 114) can determine that the input audio signal includes the application identifier "Foodbot". The NLP component 112 or chatbot component 114 can further identify the query in the input audio signal. The NLP component 112 can provide the application identifier to the chatbot component 114. The chatbot component 114 can perform a lookup in a chatbot data structure 130 to identify a chatbot that maps to the application identifier "Foodbot". In some cases, the input audio signal may not include a chatbot identifier, but may include a query that indicates a type of chatbot that can provide a response to the query. For example, the chatbot data structure 130 can include keywords or other information that describes, for each chatbot, the goods, service or function the chatbot can provide (e.g., restaurant search). The chatbot component 114 can use the identifier determined via the chatbot data structure 130 to launch, initiate, execute or otherwise activate the corresponding chatbot. In some cases, the identifier can include or be associated with a filename or file path, pointer, web address, internet protocol address, uniform resource locator, or other identifying information for the chatbot. For example, the data processing system 102 can determine the recipe chatbot is provided via the third-party chatbot provider device 108, and instruct the third-party chatbot provider device 108 to launch the restaurant search chatbot and engage with the computing device 104 either directly or via the data processing system 102 (e.g., via the chatbot component 114).

Thus, the data processing system 102 can determine, from the input audio signal, an application identifier and a query to be input into an application corresponding to the application identifier. The data processing system 102 can provide the query to the application or chatbot to cause the application to generate a second query for transmission to a third-party server, and identify a plurality of responses to the query for display via the computing device 104. For example, the chatbot component 114 can at least partially execute the chatbot or facilitate interfacing between the chatbot and computing device 104. The data processing system 102 can invoke the chatbot and input the query received via the input audio signal. The chatbot, upon execution, can identify the query and then generate a second query to transmit to the third-party chatbot provider device 108. The third-party chatbot provider device 108 can receive the second query, perform a search, and then generate one or more responses to the query.

In some cases, prior to launching or causing the launch or execution of the chatbot, the data processing system 102 can determine whether the computing device 104 is authorized to access the chatbot. The data processing system 102 (e.g., via chatbot component 114) can perform a lookup in the data repository 122 (e.g., chatbot data 130) with the identifier of the computing device 104 to determine if the computing device 104 is authorized to access the computer program comprising the chatbot. Authorization can be based on a subscription, plan, restriction, resource requirement, versioning, or device functionality. For example, the data processing system 102 can grant the computing device 104 access to the chatbot if the computing device 104 is configured with a predefined version of an operating system. In another example, the data processing system 102 can grant the computing device 104 access to the chatbot if the computing device 104 is associated with a valid account or profile. In some cases, if the data processing system 102 determines that the computing device 102 is not authorized to access the chatbot, the data processing system 102 can terminate the thread, prompt the user, or identify another chatbot the computing device 104 is authorized to access. Thus, the data processing system 102 can select the chatbot responsive to the determination that the computing device 104 is authorized to access to the chatbot.

The interface 110 can launch the chatbot itself, or transmit the instruction to a third-party chatbot provider device 108 to cause the third-party chatbot provider device 108 to invoke a conversational application programming interface associated with the chatbot (e.g., NLP component 142) and establish a communication session between the data processing system 102 or the third-party chatbot provider device 108 and the client computing device 104. Responsive to establishing the communication session between the data processing system 102 or the third-party chatbot provider device 108 and the client computing device 104, the data processing system 102 or third-party chatbot provider device 108 can transmit data packets directly to the client computing device 104 via network 105. In some cases, the third-party chatbot provider device 108 can transmit data packets to the client computing device 104 via data processing system 102 and network 105.

The chatbot provider device 108 or data processing system 102 can execute at least a portion of the chatbot provider NLP component 142. For example, the third-party chatbot provider device 108 can handle certain aspects of the communication session or types of queries. The third-party chatbot device 108 may leverage the NLP component 112 executed by the data processing system 102 to facilitate processing the audio signals associated with the communication session and generating responses to queries. In some cases, the data processing system 102 can include the conversational API 142 configured for third-party chatbot device 108. In some cases, the data processing system routes data packets between the client computing device and the third-party provider device 108 to establish the communication session. The data processing system 102 can receive, from the third-party chatbot device 108, an indication that the third-party device established the communication session with the client device 104. The indication can include an identifier of the client computing device 104, timestamp corresponding to when the communication session was established, or other information associated with the communication session, such as the data structure associated with the communication session.

The chatbot provider NLP component 142 can be a second NLP that includes one or more component or function of the first NLP 112. The chatbot provider NLP component 142 can interact or leverage the first NLP 112. In some cases, the system 100 can include a single NLP 112 executed by the data processing system 102. The single NLP 112 can support both the data processing system 102 and the chatbot. In some cases, interface 110 generates or constructs a data structure to facilitate performing a service, and the conversational API generates responses or queries to further a communication session with an end user or obtain additional information to improve or enhance the end user's experience or performance of the service.

The computer program comprising the chatbot can execute on the data processing system 102, chatbot provider device 108, or computing device 104. The chatbot can receive and process one or more digital files or portions of one or more digital files to determine a response. For example, the chatbot can execute as the chatbot component 114 on the data processing system 102.

The chatbot, upon execution, can identify the input query. The data processing system 102 can invoke, execute, or launch the chatbot and input the query received or determined based on the input audio signal from the computing device 104. For example, the data packets received by the data processing system 102 from the computing device 104 can include the application identifier and the query. The data processing system 102 (e.g., via chatbot component 114) can invoke a chatbot corresponding to the application identifier, and then input the query "good restaurants nearby". The chatbot component 114 can generate a second query to be input to the chatbot or provided to the third-party chatbot provider device 108 in order to perform a search and generate one or more responses.

The chatbot component 114 can generate the second query based on the input query in the input audio signal. The second query can be transmitted to the third-party chatbot provider device 108. The second query can be formatted to facilitate processing by the third-party chatbot provider device 108. The second query can include different information relative to the first query received in the input audio signal. The second query can include additional information relative to the first query, or less information relative to the first query. The chatbot component 112 can perform initial processing or pre-processing on the input query in order to reduce the amount of processing the third-party chatbot provider device 108 may need to perform. The chatbot component 112 can perform initial processing or pre-processing on the input query in order to reduce the number remote procedure calls between the third-party chatbot provider device 108, the data processing system 102, and the computing device 104.

For example, the input query received in the input audio signal from the computing device 104 can be "Foodbot, suggest some good restaurants nearby." The chatbot component 114 can determine that there is a location component of the input query based on the term "nearby." Rather than pass the query as-is to the third-party chatbot provider device 108, which may cause the third-party chatbot provider device 108 to then query the data processing system 102 or the computing device 104 for location information, the chatbot component 114 can construct a second query and input the location information corresponding to the computing device 104. The data processing system 102 (e.g., via chatbot component 114) can determine the location of the computing device 104. The data processing system 102 can determine location preferences established in a profile of the computing device 104. Location preferences can include, for example, to block the transmission of location, or permissible location resolution to transmit (e.g., an address, within 100 meters radius, 200 meters, 300 meters, 500 meters, 1000 meters, 1 mile, zip code, city, town, or county). Based on the location preferences, the data processing system 102 can identify a current location of the computing device 104 and construct the second query to include the location information as follows: "identify good restaurants near 123 Main Street, Anytown, USA". Thus, by pre-processing the input query to identify missing information, and then determining the missing information and generating a second query that includes the determined information, the data processing system 102 can improve the overall system efficiency by reducing excess remote procedure calls performed by the third-party chat provider device 108, thereby reducing computing resource utilization or battery consumption of the computing device 104.

The chatbot component 114 can provide the generated second query to the third-party chatbot provider device 108. The third-party chatbot provider device 108 can identify one or more responses to the query using a natural language processing technique, search engine technique, pattern matching technique, or semantic analysis technique. For example, the chatbot can perform a search using the query and then generate responses that include the search results.

The third-party chatbot provider device 108 can execute or perform a search using the second query provided by the chatbot component 114. The third-party chatbot provider device 108 can access one or more databases internal or external to the third-party chatbot provider device 108. In some cases, the third-party chatbot provider device 108 can utilize one or more component, function, resource or database of the data processing system 102 to perform the search. The third-party chatbot provider device 108 can identify a plurality of responses to the second query. The plurality of responses can include search results. The plurality of responses can include, for example, a list of restaurants that satisfy the search criteria defined by the second query. For example, the list of restaurants can include restaurants that are within a radius of the current location of the computing device 104, and that are "good" based on a rating of the restaurant being greater than or equal to 4 stars.

The data processing system 102 can include, execute, or otherwise communicate with a hooking component 116 to obtain, prior to display on the computing device 104 and from the chatbot application (or third-party chatbot provider device 108 that at least partially executes the chatbot application or generates responses to the second query) one or more responses to the second query. In the event the data processing system 102 executes the chatbot application to identify the responses to the second query, the hooking component 116 can obtain the responses prior to the chatbot application transmitting the responses to the computing device 104. In some cases, the hooking component 116 can intercept the responses from the third-party chat provider device 108 as the responses may be intended to be directed towards either the chatbot application or the computing device 104 for display. Intercepting can refer to the hooking component 116 obtaining the responses and forwarding them to the content selector component 118 as opposed to the chatbot component 114, or computing device 104 for display.

The chatbot application can generate responses to the second query by executing on at least one of the data processing system 102, chatbot component 114, or third-party chatbot provider device 108. Upon generating or identifying the responses to the second query, the chatbot application (whether executed at least partially on one or more of the data processing system 102, third-party chatbot provider device 108, or the computing device 104) can transmit or provide the responses for presentation via the display 132 of computing device 104. However, prior to presenting the results for display, the hooking component 116 can obtain or intercept the responses to the second query. The hooking component 116 can obtain or intercept the responses from a component of the data processing system 102, the third-party chatbot provider device 108, or the computing device 104.

The system 100 can include a hooking component 118 executing on one or more of the data processing system 102 or client computing device 104 to obtain or intercept the responses to the second query before the responses are provided for display on the computing device 104. The hooking component 114 can obtain or intercept the responses and re-direct the responses to the output merger component 120.

The hooking component 116 can obtain or intercept the responses to the second query using hooking techniques designed to intercept function calls, responses, digital components, messages or events passed between components of the data processing system 102, between the data processing system 102 and the computing device 104, between the data processing system 102 and the third-party provider device 108, or between the third-party provider device 108 and the computing device 104. The hooking component 116 can insert an event hook at runtime of the chatbot application that is configured to intercept the responses. In some implementations, the hooking component 118 can execute within a network stack, e.g. prior to delivery of data to an application layer of the stack. In other implementations, the hooking component 118 can execute within a kernel level of an operating system, a user level, or may be executed by a hypervisor independently of one or more virtual machines.

For example, a hooking component 118 executing on the data processing system 102 or computing device 104 can obtain or intercept the responses provided via the chatbot application or third-party chatbot provider device 108 and forward the responses to the content selector component 118. The hooking component can be configured to re-route or re-direct the responses to the content selector component 118. The interception may occur at any convenient or appropriate part of processing, such as in the network stack (e.g. at or below the application layer); after the responses have been written to memory or a buffer for the sandboxed media environment, but before a processing thread of the sandboxed media environment reads the digital component; etc.

The data processing system 102 can include, execute, or otherwise communicate with a content selector component 118 to receive, from the chatbot application, the responses to the second query and select a digital component. The content selector component 118 can parse the responses received from the chatbot application and generate a keyword. The content selector component 118 can execute a real-time content selection process with the keyword that is generated based on the responses that were intercepted by the hooking component 116. The content selector component 118 can identify a digital component using the real-time content selection process. The digital component can be provided by the content provider device 106.

The content selector component 118 can generate one or more keywords based on the responses from the chatbot component 118. The content selector component 118 can parse the responses to identify the one or more keywords. The content selector component 118 can use a semantic analysis technique, machine learning model, pattern matching technique, or other keyword generation technique to identify or generate the one or more keywords. The content selector component 118 can identify topic verticals, concepts, categories, goods, services, or entities associated with the responses to generate a keyword. For example, the responses to a query "good restaurants nearby" can include the following three results: i) Restaurant A, ii) Restaurant B, and iii) Restaurant C. The results can further include a description of the type of food served at each of the restaurant. The type of food can include burgers and fries at Restaurant A, pizza and pasta at Restaurant B, and pancakes and waffles at Restaurant C. The content selector component 118 can parse these results to generate the following keywords: burgers, fries, pizza, pasta, pancakes, and waffles. The content selector component 118 can input these automatically generated keywords into a real-time content selection process to select a sponsored digital component.

The real-time content selection process can refer to, or include, selecting sponsored digital component objects provided by third party content providers 106. The real-time content selection process can include a service in which digital components provided by multiple content providers are parsed, processed, weighted, or matched in order to select one or more digital components to provide to the computing device 104. The content selector component 118 can perform the content selection process in real-time. Performing the content selection process in real-time can refer to performing the content selection process responsive to the request for content received via the client computing device 104. The real-time content selection process can be performed (e.g., initiated or completed) within a time interval of receiving the request (e.g., 5 seconds, 10 seconds, 20 seconds, 30 seconds, 1 minute, 2 minutes, 3 minutes, 5 minutes, 10 minutes, or 20 minutes). The real-time content selection process can be performed during a communication session with the client computing device 104, or within a time interval after the communication session is terminated.

For example, the data processing system 102 can include a content selector component 118 designed, constructed, configured or operational to select digital component objects. The content selector component 118 can identify, analyze, or recognize voice, audio, terms, characters, text, symbols, or images of the candidate digital components using an image processing technique, character recognition technique, natural language processing technique, or database lookup. The candidate digital components can include metadata indicative of the subject matter of the candidate digital components, in which case the content selector component 118 can process the metadata to determine whether the subject matter of the candidate digital component corresponds to the input audio signal.

Content providers 106 can provide additional indicators when setting up a content campaign that includes digital components. The content provider computing device 106 can provide information at the content campaign or content group level that the content selector component 118 can identify by performing a lookup using information about the candidate digital component. For example, the candidate digital component may include a unique identifier, which may map to a content group, content campaign, or content provider. The content selector component 118 can determine, based on information stored in content campaign data structure in data repository 122, information about the content provider computing device 106.

The data processing system 102 can automatically generate a request for content responsive to intercepting, from the chat application, the responses to the second query. The data processing system 102 can receive a request for content for provision via a computing device 104. The request can include selection criteria of the request, such as the device type, location, and a keyword associated with the request.

Responsive to the request, the data processing system 102 can select a digital component object from data repository 122 or a database associated with the content provider computing device 106, and provide the digital component for presentation via the computing device 104 via network 105. The digital component object can be provided by a content provider device 108 different from the chatbot provider device 108. The computing device 104 can interact with the digital component object. The computing device 104 can receive an audio response to the digital component. The computing device 104 can receive an indication to select a hyperlink or other button associated with the digital component object that causes or allows the computing device 104 to identify content provider computing device 106, request a service from the content provider computing device 106, instruct the content provider computing device 106 to perform a service, transmit information to the content provider computing device 106, or otherwise identify a good or service associated with content provider computing device 106.

The request for content can include content selection criteria, such as a format of the content, keywords, concepts, profile information, or other information that can facilitate content selection. The content selector component 118 can perform a real-time content selection process. Real-time content selection can refer to performing the content selection responsive to the request for content. The request for content can be generated, transmitted or otherwise provided after the chatbot identifies the dialog data structure that is responsive to the voice input.

The content selector component 118 can select a digital component that includes text, string, or characters that can be processed by a text to speech system or presentable via a display. The content selector component 118 can select a digital component that is in a parameterized format configured for a parametrically driven text to speech technique. In some cases, the dialog data structure can be in SSML format or be configured with voice parameters. The data processing system 102 can configure the voice parameters of the digital component to match the voice parameters of the dialog data structure identified by the chatbot such that the digital component can be presented to the user of the computing device 104 with a native voice, image, or acoustic fingerprint (e.g., the digital component has the same or similar acoustic properties as compared to the dialog data structure without the digital component).

The content selector component 118 can select a digital component that is in a parameterized format configured for text to speech instead of a digital component that is in an audio file format. For example, the content selector component 118 may not select a digital component in an audio file in an audio file format or audio coding format, such as .WAV, .AIFF, or .AU, because a digital component already in an audio file format may not be configured for seamless insertion into the placeholder field of the dialog data structure identified by the chatbot computer program. A digital component in an audio file format may have a different acoustic fingerprint as compared to a native voice of the computing device or the acoustic fingerprint set for the chatbot. If the digital component audio file has a different acoustic fingerprint as compared to the native voice or acoustic fingerprint of the chatbot or the dialog data structure (e.g., words are spoken at different rate, at a different frequency, different pitch, different tone, different volume, or different accent), then inserting or integrating the digital component audio file into the placeholder field in the dialog data structure may not be seamless, smooth or continuous.

For example, the digital component audio file having the different acoustic fingerprint can cause awkward transitions or indication of disparity. Thus, by providing the digital component configured for a text to speech technique in which the chatbot or computing device can play the digital component in a manner that corresponds to the acoustic fingerprint or native voice of the chatbot or computing device, the data processing system 102 can facilitate providing the seamless modification of chatbot computer program output.

The content selector component 118 can select a digital component that is in a format configured for display via a display device 132. The content selector component 118 can select a digital component that can be re-formatted to match a native output format of the chatbot application.

The content selector component 118 can select multiple digital components via the real-time content selection process. The content selector component 118 can score and rank the digital components, and provide multiple digital components to the output merger component 120 to allow the output merger component 120 to select the highest ranking digital component.

The content selector component 118 can provide the selected digital component to the output merger component 120. The data processing system 102 can include, execute, or otherwise communicate with an output merger component 120 to combine or integrate the selected digital component with the responses received from the chatbot application for presentation via the computing device 104. The output merger component 120 can provide the combined digital component and the responses for presentation via audio output or visual output.

To reduce redundant entries, and thereby prevent or reduce network bandwidth utilization or processor utilization by the computing device 104, the output merger component 120 can execute a deduplication process with the digital component and the plurality of responses generated by the chatbot application. Deduplication can refer to the elimination or removal of duplicate or redundant entries in computer data. The deduplication technique can ensure that only one unique instance of data is retained in the output. The redundant data entry can be replaced with a new data entry.

For example, the digital component selected by the content selector component 118 can include a digital component for Restaurant A, which is also one of the responses generated by the chatbot application in response to the second query. In this example, the output merger component 120 can delete or remove the digital component and select a second digital component (e.g., the second ranking digital component output from the real-time content selection process). Thus, based on the deduplication process results, the data processing system 102 can request additional digital components, block insertion of the digital component, or determine to add the digital component if it is not a duplicate entry.

The output merger component 120 can determine, responsive to the deduplication process executed with the digital component and the plurality of responses by the chatbot application, to add the digital component to the responses. The output merger component 120 can determine that the digital component is unique or different from the responses. The output merger component 120 can then construct a display output that includes the digital component and the responses from the chatbot application.

To manage the rendering of the display output via a graphical user interface and reduce the graphics processor utilization, CPU utilization or memory utilization, as well as network bandwidth utilization when transmitting the digital component and the results, the output merger component 120 can construct a display output using a unified graphical layout. For example, rather than using a first graphical theme for the responses and a second, different graphical theme, for the digital component, which would require different layouts, styles, colors, graphics, the output merger component 120 can determine to use a single, unified, graphical theme and layout for the merged data set.

To construct the display output, the output merger component 120 can retrieve, from the template data structure 124 stored in the data repository 122, a graphical user interface template. The graphical user interface template can define, provide, set, or otherwise indicate a font, a color, and a layout the output merger component 120 can use to generate the display output. The output merger component 120 can select a graphical user interface template based on the application identifier of the chatbot application. For example, each application identifier (e.g., each chatbot application) can be established with a graphical user interface template. The third-party chatbot provider device 108 can set, configure, establish or design the graphical user interface template. The graphical user interface template can include a font for text, a color, a layout, or other graphical user interface or display elements. In some cases, the graphical user interface template can include or define animations, transparency, positioning, size, or sounds.

The output merger component 120 can retrieve the graphical user template from the template data structure by performing a lookup in the template data structure 124. The template data structure 124 can store the graphical user interface template in an index data structure. In some cases, the computing device 104 can establish a custom graphical user interface for the computing device 104, which can include a preferred theme, layout, number of responses, or font. The output merger component 120 can generate a tuple formed from the application identifier and an identifier of the computing device 104, and use the tuple to perform a lookup in the template data structure 124 to retrieve the graphical user interface template established for the specific chatbot application and customized for use with the computing device 104.

In some cases, the output merger component 120 can request the graphical user interface template from the third-party chatbot provider device 108. For example, the output merger component 120 can determine that the template data structure 124 does not include a graphical user template corresponding to the application identifier of the chatbot, or that the stored graphical user template has expired, is stale, or outdated. The output merger component 120 can transmit a request to the third-party chat provider device 108 corresponding to the application identifier, and then receive, responsive to the request, the graphical user interface template to use for constructing the display output. The output merger component 120 can then update the template data structure 124 in the data repository 122 with the received graphical user interface template, and use it to construct subsequent display output.

The output merger component 120 can select a position among the responses received from the chatbot application at which to insert or place the digital component. The graphical user interface template for the chatbot application can indicate the position at which to insert the digital component. The graphical user interface template can indicate to append the digital component to the list of responses. The graphical user interface template can indicate to add the digital component prior to the list of responses, or among the list of responses (e.g., after the first response, after the second response, or after the third response). The graphical user interface template can indicate to add the digital component at a position such that the digital component appears to be uniform or similar to the responses to provide the appearance that the responses and the digital component are provided by the same source, such as the chatbot application.

In some cases, the output merger component 120 can dynamically select the position. For example, the output merger component 120 can determine the position based on performance information using historical interactions with digital components. The output merger component 120 can use a machine learning model to determine where to insert the digital component. The machine learning model can be generated with historical performance data collected from a plurality of instances of the chatbot application. The performance data can indicate features associated with a click, selection or conversion. The data processing system 102 can receive indications of interactions with the digital component. The interaction with the digital component can occur via an interface or component of the computing device 104. The data processing system 102 can record, store or otherwise monitor and track the interactions with the digital component, and information about or associated with the interaction.

The machine learning model can more heavily weight positions associated with a click, selection or conversion on the digital component, while reducing weights associated with positions that do not receive clicks, selections or conversions. The machine learning model can generate different models for different types of digital component, topics, keywords, computing devices, or other parameters in order to customize the machine learning model to determine a position at which to insert the digital component.

The output merger component 120 can construct a display output using the retrieved graphical user interface template. The output merger component 120 can construct the display output by integrating the digital component selected via the real-time content selection process with the responses generated by the chatbot application. The output merger component 120 can apply the graphical user template uniformly to both the digital component and the responses to improve the efficiency in rendering the display output by the computing device 104. To construct the display output, the output merger component 120 can modify the font or color of the digital component to integrate the digital component with the responses. The output merger component 120 can provide the display output to the computing device 104 to cause the computing device 104 to render the display output for presentation via the display 132.

The computing device 104 can include, execute, or be referred to as a digital assistant device. The digital assistant device (or computing device 104) can include a display device 132, graphics driver 146, a sensor to detect an input audio signal, and a pre-processor component 140 coupled to the display device, the graphics driver, and the sensor. The graphics driver 146 can receive display output from the data processing system 102, and render the display output on display device 132. The graphics driver 146 can include hardware or software components that control or enhance or how graphics or visual output is displayed on the display 132. The graphics driver 146 can include, for example, a program that controls how the graphic components work with the rest of the computing device 104 (or digital assistant). The pre-processor component 140 filter the input audio signal to create a filtered input audio signal, convert the filtered input audio signal to data packets, and transmit the data packets to a data processing system comprising one or more processors and memory.

The digital assistant device can include an audio driver 138 and a speaker component (e.g., transducer 136). The pre-processor component 140 to receive an indication of the display output and instruct the audio driver 138 to generate an output audio signal to cause the speaker component (e.g., transducer 136) to transmit an audio output corresponding to the indication of the display output. The audio output can include a text-to-speech representation of the text depicted in textbox 312 in FIG. 3, for example.

Figure 2:
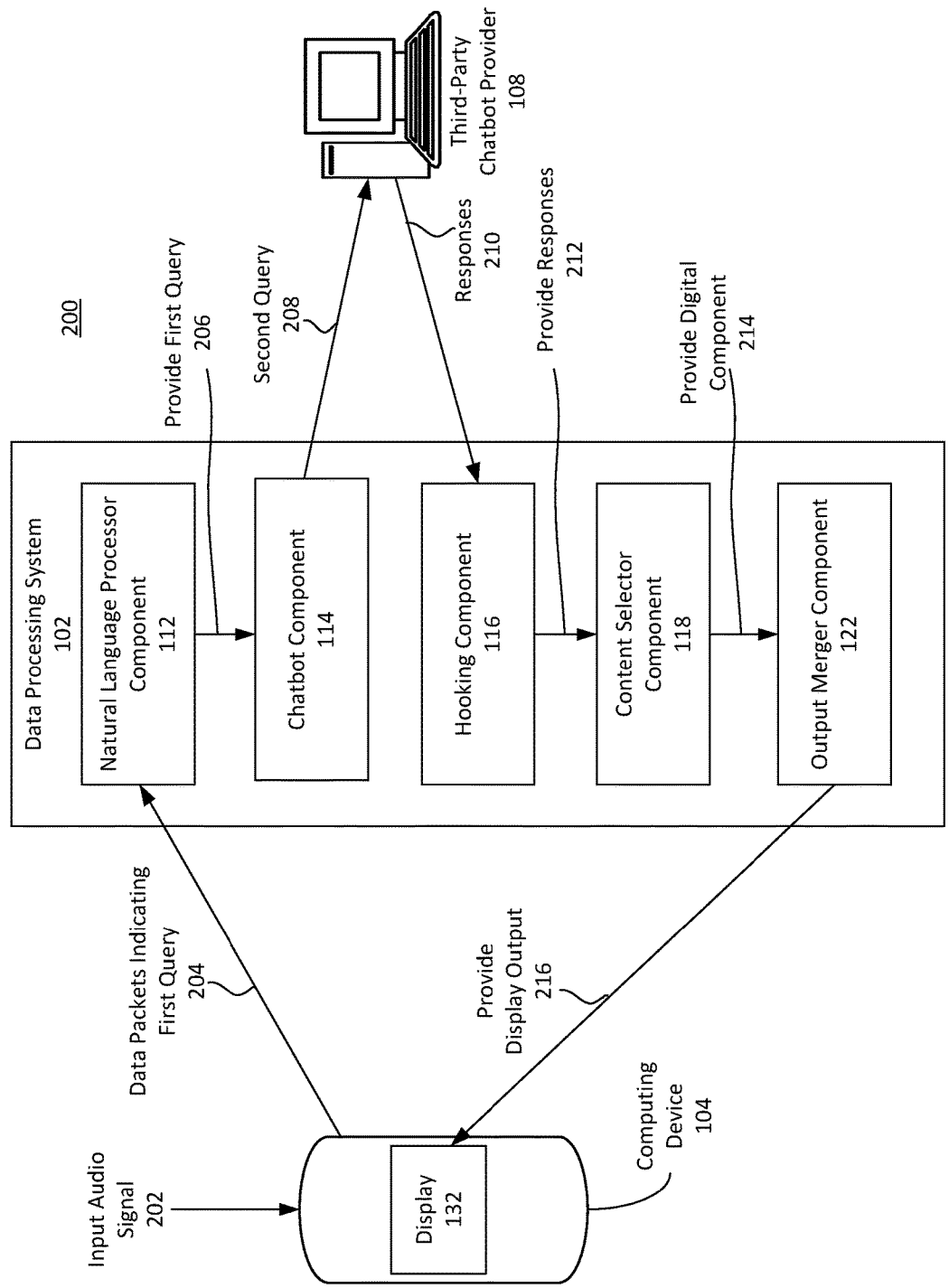
FIG. 2 is an illustration of an operation of a system to manage rendering of a graphical user interface.

FIG. 2 is an illustration of an operation of a system 200 to manage rendering of a graphical user interface. The operation of system 200 can include one or more component or functionality of system 100 depicted in FIG. 1. For example, the operation of system 200 can be performed by a data processing system 102, computing device 104, third-party chatbot provider device 108, or content provider device 106. At ACT 202, the computing device 104 can detect or receive an input audio signal. The input audio signal can include voice input spoken by an end user. The input audio signal can include a first query. The input audio signal may or may not include an application identifier. The input audio signal can include an identifier of a chatbot application with which to perform the query. The input audio signal may not include the application identifier, however, and the data processing system 102 can automatically determine the chatbot application to invoke to perform the query. In some cases, if the input audio signal does not include the application identifier, the computing device 104, or data processing system 102, can provide an audio or visual prompt requesting the end user to provide an indication of the chatbot application to use to perform the query.

At ACT 204, the computing device 104 transmits data packets indicate the first query. The data processing system 102 can receive the first query. The NLP component 112 of the data processing system 102 can process the data packets to identify the first query or the application identifier. The data processing system 102 can provide the first query to a chatbot component 114 or directly provide the first query to the third-party chatbot provider sever 108.

At ACT 206, the data processing system 102 can provide the first query to the chatbot component 114. The chatbot component 114 can identify the query and the application identifier corresponding to the chatbot application that can execute the query to generate response. The chatbot component 114 can generate a second query based on the first query. The second query can be in a format that facilitates the chatbot application to generate responses to the first query. The second query can filter out information that may be not needed by the chatbot application to generate responses to the query. The chatbot component 14 can add information relative to the first query to generate the second query. The chatbot component 114 can otherwise construct or generate the second query to facilitate the third-party chatbot application to generate responses to the query while reducing remote procedure calls. For example, the first query may not include location information for the computing device 104, but the location information may be helpful or required to generate responses. The chatbot component 114 can detect that the location information is missing in the first query, and further determine to include the location information when generating the second query. The chatbot component 114 can determine to include the location information because the chatbot component 114 can determine that the absence of the location information in the second query can cause the chatbot application or third-party chatbot provider 108 to return an error or generate a prompt for location information. Thus, to prevent the chatbot application or third-party chatbot provider 108 from having a run-time error or generating a subsequent prompt for additional information, the chatbot component 114 can proactively, and automatically, determine the location information for the computing device and generate the second query including the location information. By generating a complete second query without missing information, the chatbot component 114 can facilitate reducing latency or delay in generating responses to the input audio signal.

At ACT 208, the chatbot component 114 provides the second query to the third-party chatbot provider 108. In some cases, the NLP component 112 or chatbot component 114 can forward the first query to the third-party chatbot provider server 108 without altering, modifying or otherwise adjusting the first query. For example, the chatbot component 114 can determine that the first query includes sufficient information to allow the third-party chatbot provider 108 to generate responses. In some cases, the chatbot component 114 can forward the first query to the third-party chatbot provider 108, and the third-party chatbot provider can generate a request for additional information to facilitate identifying responses. The third-party chatbot provider 108 can transmit the request for additional information to the chatbot component 114, data processing system 102, or directly to the computing device 104. Upon receiving the requested additional information, the third-party chatbot provider 108 can generate the second query and identify responses to the second query, which may also be responsive to the first query.

The third-party chatbot provider device 108 can perform the second query to identify responses, and then provide the responses to the data processing system 102 at ACT 210. The hooking component 116 can intercept the responses. For example, the responses may have been intended to go directly to the output merger component 122 or directly to the computing device 104. The hooking component 116 can intercept the responses and then provide the responses to the content selector component 118 at ACT 212. The content selector component 118 can parse the responses, generate one or more keywords based on the responses, and then perform a real-time content selection process with the one or more keywords. The content selector component 118 can provide the selected one or more digital components to the output merger component 122 at ACT 214. The output merger component 122 can perform a deduplication process, retrieve a graphical user interface template, and construct a uniform display output that combines the digital component with the responses from the third-party chatbot provider device 108. The output merger component 122 can transmit or provide the display output to the computing device 104 at ACT 216. The computing device 104 can render the display output via display device 132 to present the output visually to the end user that provided the input audio signal.

Figure 3:
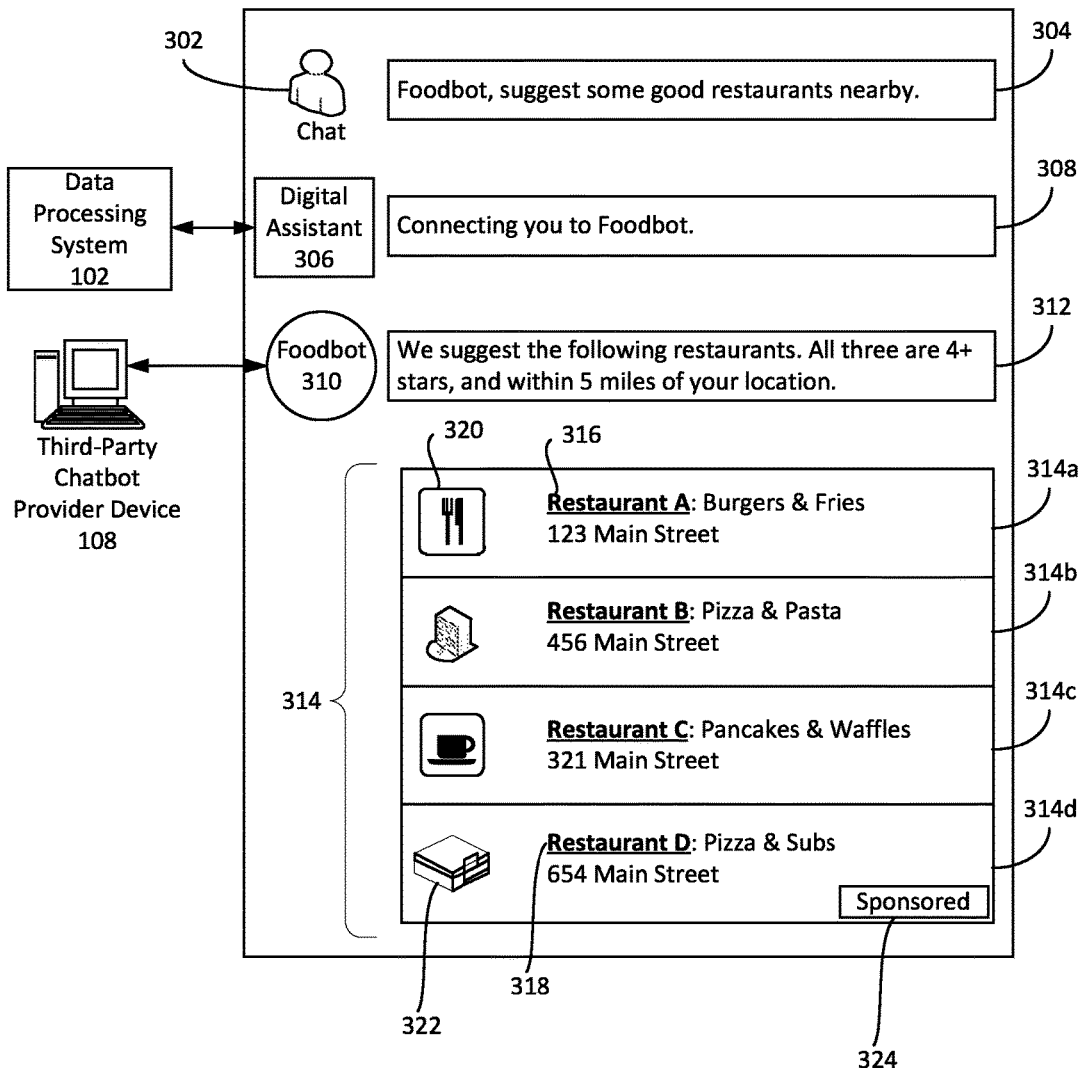
FIG. 3 is an illustration of a graphical user interface provided by a system to manage rending of a graphical user interface.

FIG. 3 is an illustration of an implementation of a graphical user interface provided by a system to manage rending of a graphical user interface. The graphical user interface 300 can be provided by one or more component or system depicted in FIG. 1, FIG. 2, or FIG. 5. A user can input an audio signal into a digital assistant 306 (e.g., a digital assistant executed by computing device 102). The graphical user interface 300 provided by the digital assistant 306 executed by computing device 102 can indicate an icon 302 for the user, and visually present the text of the input audio signal in text box 304 as follows "Foodbot, suggest some good restaurants nearby." The input audio signal can include an application identifier and a query. In this example, the application identifier can be "Foodbot", and the query can be "suggest some good restaurants nearby." The digital assistant 306 can identify the application identifier. The digital assistant 306 can identify the application identifier by locally parsing the input audio signal, or transmitting data packets to the data processing system 102 and then receiving a response from the data processing system 102 with an indication of the application identifier. The digital assistant 306 can provide a status indication, such as "Connecting you to Foodbot" in textbox 308. In some cases, the digital assistant 306 can provide an audio indication of the status.

The data processing system 102 or digital assistant 306 can interact with a third-party chatbot provider device 108 to obtain responses to the query. The digital assistant 306 or data processing system 102 can transmit, to the third-party chatbot provider device 108, the received query as-is, or generate a second query based on the first query that can facilitate the third-party chatbot provider device 108 identifying responses.

The data processing system 102 can receive an indication of the responses from the third-party chatbot provider device 108, generate a keyword, perform a real-time content selection processor with the keyword to identify a digital component, and then merge the digital component with the responses using a graphical user interface template. The data processing system 102 can provide display output comprising the digital component integrated with the responses.

The digital assistant 306 can receive the display output and render the display output 314. The digital assistant 306 can display an icon 310 for Foodbot and include a textbox 312 indicating the responses. For example, the textbox 312 can state "We suggest the following restaurants. All three are 4+ stars, and within 5 miles of your location." This text can correspond to the input query 304. For example, the input term "good" may have caused the Foodbot 310 to identify restaurants that are 4+ stars. The input term "nearby" may have caused the Foodbot 310 to identify restaurants within 5 miles of the current location of the computing device 104.

The display output 314 can be constructed using a graphical user interface template for the Foodbot 310. The display output 314 can include the responses from the third-party chatbot provider device 108 and the sponsored digital component. The graphical user interface template can define a layout, color, and font for the responses and digital component. For example, the graphical user template can define: i) a layout comprising a single column with a separate row for each response (e.g., 4 rows, one row for each restaurant); ii) an icon 320 for the response positioned on the left side of the row; iii) two lines of text for each response, where the first line of text includes the name of the restaurant bolded and underlined, followed by a colon, followed by a description of the food served at the restaurant, and the second line of the text includes the street address of the restaurant.

To integrate the digital component with the responses from the third-party chatbot server, the data processing system 102 can apply the graphical user template to both the responses provided by the chatbot as well as the digital component selected via the real-time content selection process to generate the display output 314. Integrating the digital component with the responses can refer to adding the digital component to the responses in a manner that preserves or maintains the look and feel, or other user interface features. Integrating the digital component with the responses can refer to combining the digital component with the responses in a manner that preserves or maintains the look and feel, or other user interface features.

The data processing system can integrate the digital component with the responses using the graphical user interface template. The graphical user interface template can indicate to append the digital component to the responses. Thus, the display output 314 can include i) a first response 314a for Restaurant A that includes the description "Burgers & Fries" on the first text line, with the address "123 Main Street" on the second line; ii) a second response 314b for Restaurant B that includes the description "Pizza & Pasta" on the first text line, with the address "456 Main street" on the second text line; and iii) a third response 314c for Restaurant C that includes the description "Pancakes & Waffles" on the first text line, with the address "321 Main Street" on the second text line. The data processing system 102 can append a digital component 314d for Restaurant D using the same graphical user interface template as used for responses 314a-c. The data processing system 102 can select a digital component for Restaurant D by generating a keyword based on responses 314a-c, and inputting the keyword into a real-time content selection process. The data processing system 102 can construct the display output to integrate the digital component with the responses such that the digital component matches the same graphical user interface elements of the responses 314a-c. For example, the digital component can match the layout with two lines of text and an icon 322. The text for the digital component can include the name of the restaurant 318 bolded and underlined, followed by a colon and a description "Pizza & Subs", with a second text line including the address. The text 318 can be bolded and underlined similar to text 316 for Restaurant A to match the style. However, the display of the digital component can vary by including an indication that it is a sponsored digital component 324.

Figure 4:
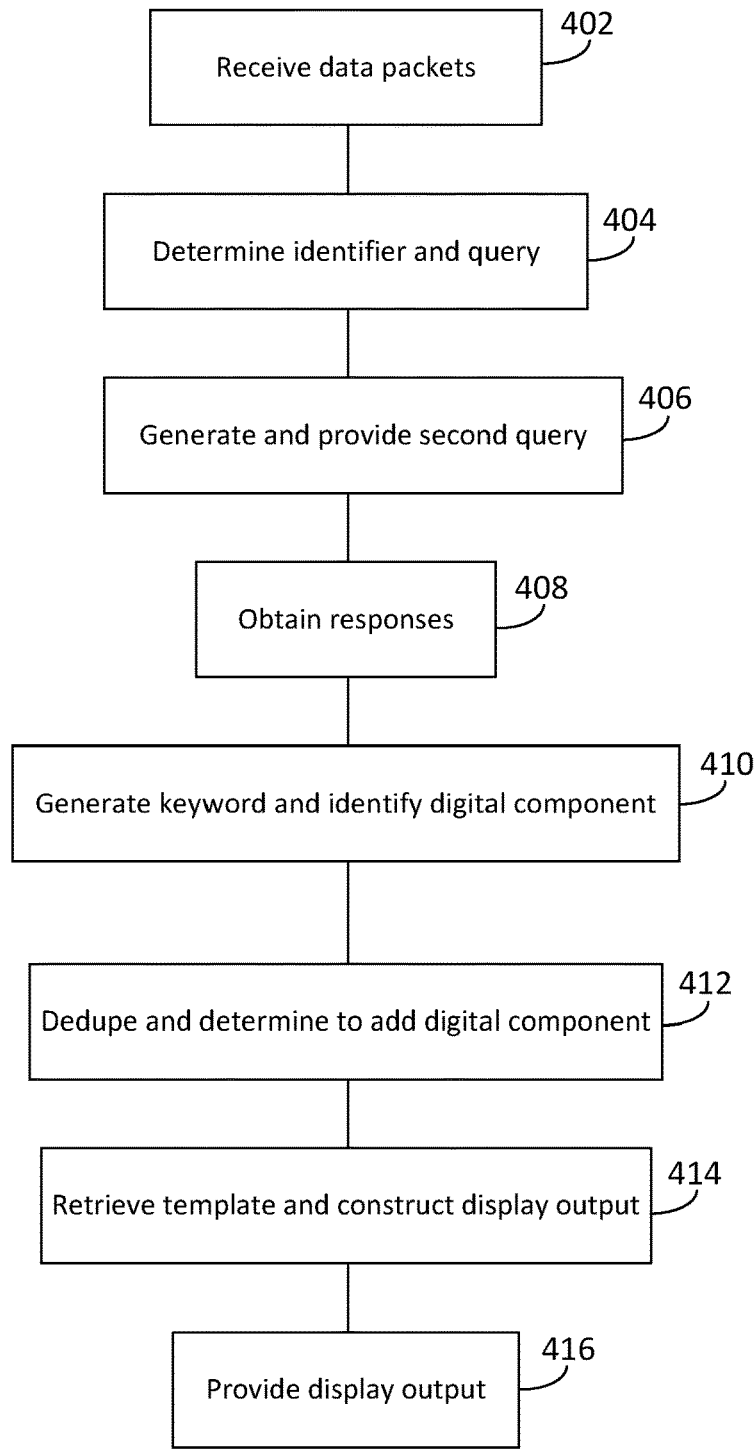
FIG. 4 is an illustration of a method of managing rendering of a graphical user interface.

FIG. 4 is an illustration of a method of managing rendering of a graphical user interface. The method 400 can be performed by one or more component or system depicted in FIG. 1, FIG. 2 or FIG. 5. The method 400 can include the data processing system receiving data packets at 402. The data processing system can receive the data packets via an interface. The data packets can include an input audio signal detected by a sensor of a computing device. For example, a microphone of a digital assistant device can detect the input audio signal.

At ACT 404, the data processing system can determine an identifier and a query. The data processing system can determine an application identifier and a first query to be input into an application corresponding to the application identifier. The data processing system can determine the application identifier and the first query based on processing or parsing the input audio signal. The data processing system can apply natural language processing techniques or semantic analysis technique to identify the application identifier and the first query. The application identifier can identify or indicate a chatbot application. The chatbot application can be invoked to execute or process the query. The chatbot application can include a conversational application programming interface configured to process the query.

At ACT 406, the data processing system can generate and provide a second query. The data processing system can generate the second query based on the first query. The data processing system can generate the second query based on the first query and information associated with the computing device that detected the input audio signal. The data processing system can supplement the first query with additional information to generate the second query. For example, the first query can include an indication of a location-related term, such as "near me", "nearby", "close by", "within walking distance" or "in my neighborhood". The data processing system (e.g., via a chatbot component) can parse the first query to identify this location-related term. The data processing system can determine the information associated with this term, such as the current location of the computing device. The data processing system can then generate a second query that includes the location information. For example, if the first query is "find restaurants near me", the second query can be "find restaurants in San Jose, Calif.". The data processing system can transmit or provide the second query to a chatbot application or third-party chatbot provider server.

In some cases, the data processing system can directly provide the first query to the third-party chatbot provider server. The third-party chatbot provider server can parse the first query and determine that additional information may be required to generate relevant responses to the first query. Responsive to parsing the first query and identifying missing information or that additional information may facilitate generating responses, the third-party server can generate a prompt or request for the additional information and transmit the prompt or request to the data processing system or the computing device. The data processing system or computing device can respond to the request from the third-party server with the requested additional information.

In some cases, the data processing system can provide the query to the chatbot application. The chatbot application can receive the first query and generate a second query based on the first query. The chatbot application can execute at least partially on the data processing system. The chatbot application can include a query input interface query processing component (e.g., a chatbot component) that receive input queries or first queries, identifies missing information or otherwise preprocesses the first query to generate a second query that facilitates generating responses. The chatbot application can transmit the second query to a third-party chatbot provider server to obtain responses to the second query. The data processing system can receive responses to the second query for display via the computing device.

At ACT 408, the data processing system can obtain the responses. The data processing system can obtain or receive the responses from the third-party chatbot provider server. In some cases, the data processing system can intercept the responses prior to the responses being displayed on the computing device. The data processing system can intercept the responses using a hooking component. The responses can be transmitted by the third-party chatbot provider to the chatbot application executing on the data processing system or computing device. The hooking component can intercept the responses directed to the chatbot application executing on the data processing system or the computing device. The hooking component, upon intercepting the responses, can re-direct or forward the responses to a content selector component.

At ACT 410, the data processing system can generate a keyword and identify a digital component. The data processing system can parse the intercepted responses to generate a keyword based on responses. The data processing system can select terms in the responses to use as keywords. The data processing system can apply semantic processing to the responses to identify a topic for the responses. The data processing system can perform a real-time content selection process using the automatically generated keyword to identify a digital component provided by a content provider.

At ACT 412, the data processing system can dedupe the digital component with the responses to validate the digital component for integration with the responses. The data processing system can perform deduplication to confirm that the digital component does not match one of the organic responses provided by the third-party content provider device. If the digital component is different from the responses, the data processing system can determine to add the digital component to the responses. If the digital component matches one of the responses, the data processing system can determine to block addition of the digital component, and then select a second digital component (e.g., a second highest ranking digital component based on the content selection process).

At ACT 414, the data processing system can retrieve a template and construct display output that includes the digital component integrated with the responses. The data processing system can retrieve the template (e.g., a graphical user interface template) that defines a font, color, and a layout to render the plurality of responses. The template can include an identifier of a font, such as "Times New Roman" or an alpha numeric identifier of a font. The template can further include an indication of a font size, font style, character spacing, or line spacing. The template can include or define the color of the font, color of the text, foreground color, background color, color of icons, or other color themes to use when constructing the display output. The template can define a layout, such as the position of the graphical elements such as text, icons, responses, borders, rows, or columns.

The graphical user interface template can be provided in various formats. For example, the graphical user interface template can be provided using cascading style sheets or elements thereof to define how elements are to be displayed on the display screen. The graphical user interface template can use a user interface kit. The graphical user interface can use a *.PSD file (e.g., a photoshop editor program file format).

At ACT 416, the data processing system can provide the display output. The data processing system can transmit the generated display output to the computing device to cause the computing device to render the display output for display via a display device communicatively coupled to the computing device.

Figure 5:
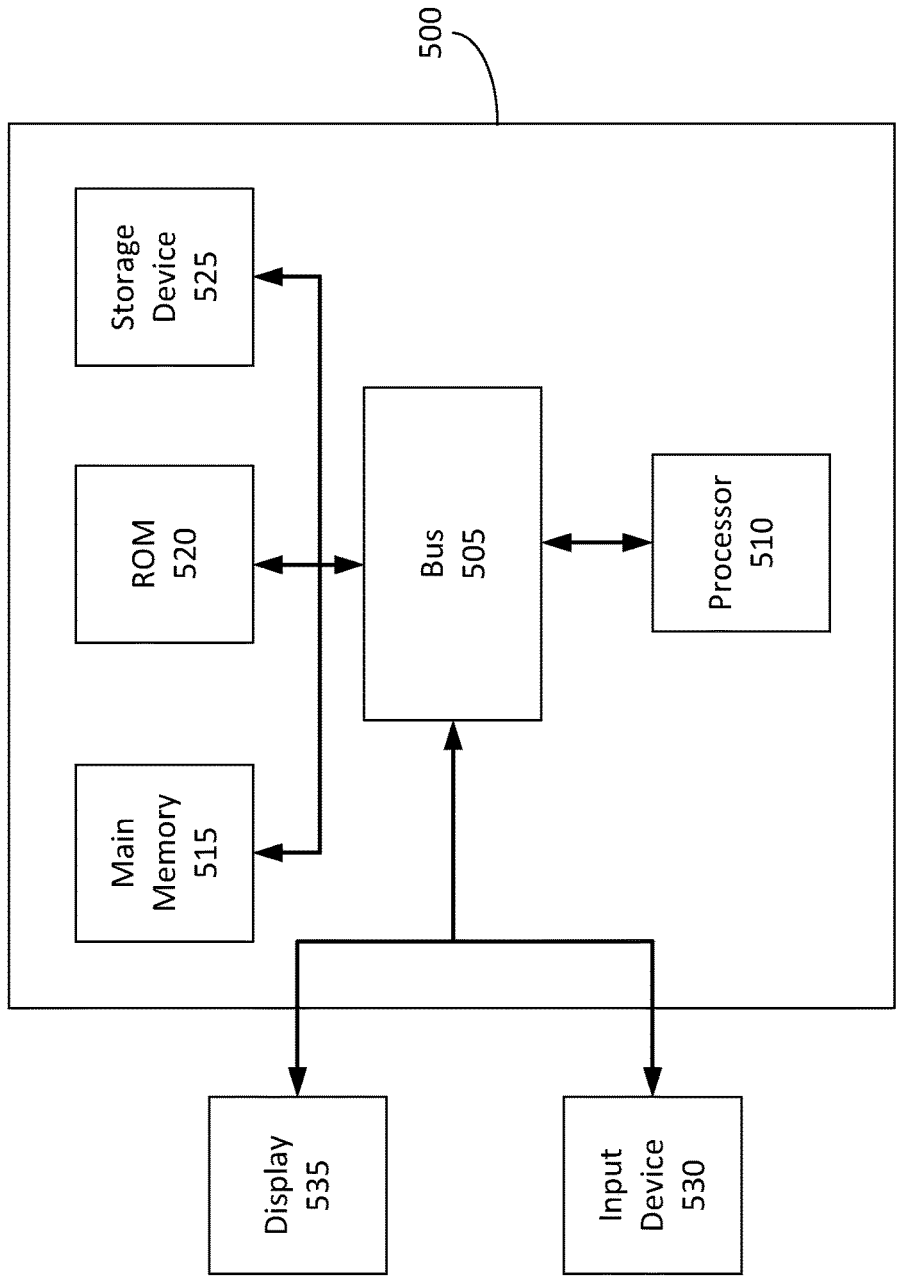
FIG. 5 is a block diagram illustrating a general architecture for a computer system that can be employed to implement elements of the systems and methods described and illustrated herein.

FIG. 5 is a block diagram of an example computer system 500. The computer system or computing device 500 can include or be used to implement the system 100, or its components such as the data processing system 102. The data processing system 102 can include an intelligent personal assistant or voice-based digital assistant. The computing system 500 includes a bus 505 or other communication component for communicating information and a processor 510 or processing circuit coupled to the bus 505 for processing information. The computing system 500 can also include one or more processors 510 or processing circuits coupled to the bus for processing information. The computing system 500 also includes main memory 515, such as a random access memory (RAM) or other dynamic storage device, coupled to the bus 505 for storing information, and instructions to be executed by the processor 510. The main memory 515 can be or include the data repository 122. The main memory 515 can also be used for storing position information, temporary variables, or other intermediate information during execution of instructions by the processor 510. The computing system 500 may further include a read-only memory (ROM) 520 or other static storage device coupled to the bus 505 for storing static information and instructions for the processor 510. A storage device 525, such as a solid-state device, magnetic disk or optical disk, can be coupled to the bus 505 to persistently store information and instructions. The storage device 525 can include or be part of the data repository 122.

The computing system 500 may be coupled via the bus 505 to a display 535, such as a liquid crystal display, or active matrix display, for displaying information to a user. An input device 530, such as a keyboard including alphanumeric and other keys, may be coupled to the bus 505 for communicating information and command selections to the processor 510. The input device 530 can include a touch screen display 535. The input device 530 can also include a cursor control, such as a mouse, a trackball, or cursor direction keys, for communicating direction information and command selections to the processor 510 and for controlling cursor movement on the display 535. The display 535 can be part of the data processing system 102, the client computing device 150 or other component of FIG. 1, for example.

The processes, systems and methods described herein can be implemented by the computing system 500 in response to the processor 510 executing an arrangement of instructions contained in main memory 515. Such instructions can be read into main memory 515 from another computer-readable medium, such as the storage device 525. Execution of the arrangement of instructions contained in main memory 515 causes the computing system 500 to perform the illustrative processes described herein. One or more processors in a multi-processing arrangement may also be employed to execute the instructions contained in main memory 515. Hard-wired circuitry can be used in place of or in combination with software instructions together with the systems and methods described herein. Systems and methods described herein are not limited to any specific combination of hardware circuitry and software.

Although an example computing system has been described in FIG. 5, the subject matter including the operations described in this specification can be implemented in other types of digital electronic circuitry, or in computer software, firmware, or hardware, including the structures disclosed in this specification and their structural equivalents, or in combinations of one or more of them.

For situations in which the systems discussed herein collect personal information about users, or may make use of personal information, the users may be provided with an opportunity to control whether programs or features that may collect personal information (e.g., information about a user's social network, social actions or activities, a user's preferences, or a user's location), or to control whether or how to receive content from a content server or other data processing system that may be more relevant to the user. In addition, certain data may be anonymized in one or more ways before it is stored or used, so that personally identifiable information is removed when generating parameters. For example, a user's identity may be anonymized so that no personally identifiable information can be determined for the user, or a user's geographic location may be generalized where location information is obtained (such as to a city, postal code, or state level), so that a particular location of a user cannot be determined. Thus, the user may have control over how information is collected about him or her and used by the content server.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively, or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "data processing system" "computing device" "component" or "data processing apparatus" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. For example, the interface 110, chatbot component 114, content selector component 118, output merger component 120, or NLP component 112 and other data processing system 102 components can include or share one or more data processing apparatuses, systems, computing devices, or processors.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 102) to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 100 or system 500 can include clients and servers. A client and server are generally remote from each other and typically interact through a communication network (e.g., the network 105). The relationship of client and server arises by virtue of computer programs running on the respective computers and having a client-server relationship to each other. In some implementations, a server transmits data (e.g., data packets representing a digital component) to a client device (e.g., for purposes of displaying data to and receiving user input from a user interacting with the client device). Data generated at the client device (e.g., a result of the user interaction) can be received from the client device at the server (e.g., received by the data processing system 102 from the computing device 104 or the content provider computing device 106 or the chatbot provider computing device 108).

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product. For example, the NLP component 112 or the content selector component 118, can be a single component, app, or program, or a logic device having one or more processing circuits, or part of one or more servers of the data processing system 102.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. For example, the data processing system 102 can identify the first query based on the input audio signal, and transmit the first query to the third-party chatbot provider device to generate responses to the first query, without generating a second query. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A system to manage rendering of a graphical user interface in a voice-driven computing environment, comprising:

a data processing system comprising one or more processors and memory to execute a natural language processor component, an interface, an output merger component, and a content selector component, the data processing system to:

receive, via the interface, data packets comprising an input audio signal detected by a sensor of a computing device;

determine, from the input audio signal, an application identifier and a first query;

generate a second query based on the first query and information associated with the computing device;

provide the second query to a third-party server that provides an application corresponding to the application identifier to cause the application to identify a plurality of responses to the second query for display via the computing device;

obtain, prior to display on the computing device and from the application, the plurality of responses identified by the application responsive to the second query transmitted to the third-party server;

parse the plurality of responses to generate a keyword based on the plurality of responses;

execute, responsive to generation of the keyword, a real-time content selection process with the keyword generated based on the plurality of responses obtained from the third-party server;

identify, based on the real-time content selection process, a digital component provided by a content provider device;

execute a deduplication process with the digital component and the plurality of responses generated by the application;

determine, responsive to the deduplication process executed with the digital component and the plurality of responses generated by the application, to add the digital component to the plurality of responses;

retrieve, for the application, a graphical user interface template defining a font, a color, and a layout to render the plurality of responses;

construct a display output using the graphical user interface template that integrates the plurality of responses generated by the application with the digital component identified based on the real-time content selection process; and provide the display output to the computing device to cause the computing device to render the display output for display via a display device communicatively coupled to the computing device.

2. The system of claim 1, comprising the data processing system to:

parse the first query to identify a location-related term;

determine, based on identification of the location-related term, a location of the computing device; and insert the location of the computing device into the first query to generate the second query.

3. The system of claim 1, comprising the data processing system to:

transmit, to the third-party server that provides the application, a request for the graphical user interface template;

receive, responsive to the request, the graphical user interface template; and store the graphical user interface template in a data repository of the data processing system.

4. The system of claim 1, comprising the data processing system to:

modify at least one of the font and the color of the digital component to integrate the digital component with the plurality of responses for the display output.

5. The system of claim 1, wherein the application comprises a third-party chatbot provided by the third-party server.

6. The system of claim 1, comprising the data processing system to:

select a position among the plurality of responses; and add the digital component to the position among the plurality of responses to construct the display output.

7. The system of claim 1, comprising the data processing system to:

select, based on a machine learning model generated with historical performance data collected from a plurality of instances of the application, a position among the plurality of responses; and add the digital component to the position among the plurality of responses to construct the display output.

8. The system of claim 1, comprising:

the data processing system to parse each of the plurality of responses using a semantic analysis technique to identify the keyword.

9. The system of claim 1, comprising the data processing system to:

generate a tuple formed from the application identifier and an identifier of the computing device; and select the graphical user interface template based on the tuple formed from the application identifier and an identifier of the computing device.

10. The system of claim 1, comprising the data processing system to:

receive a second digital component responsive to a second plurality of responses selected based on a second input signal detected by the sensor of the computing device;

execute a second deduplication process with the second digital component and the second plurality of responses generated by the application;

determine, responsive to the second deduplication process executed with the digital component and the plurality of responses generated by the application, that the second digital component matches with one of the second plurality of responses; and block addition of the second digital component to the second plurality of responses.

11. The system of claim 1, comprising the data processing system to:

receive a second digital component responsive to a second plurality of responses selected based on a second input signal detected by the sensor of the computing device;

execute a second deduplication process with the second digital component and the second plurality of responses generated by the application;

determine, responsive to the second deduplication process executed with the digital component and the plurality of responses generated by the application, that the second digital component matches with one of the second plurality of responses;

select a third digital component responsive to the determination that the second digital component matches with one of the second plurality of responses; and add the third digital component to the second plurality of responses for display via the display device.

12. A method of managing rendering of a graphical user interface in a voice-driven computing environment, comprising:

receiving, via an interface of a data processing system comprising one or more processors, data packets comprising an input audio signal detected by a sensor of a computing device;

determine, by the data processing system from the input audio signal, an application identifier and a first query for input into an application corresponding to the application identifier;

generating, by the data processing system, a second query based on the first query;

providing, by the data processing system, the second query to a third-party server to cause the third-party server to identify a plurality of responses to the second query for display via the computing device;

obtaining, by the data processing system, prior to display on the computing device and from the application, the plurality of responses identified by the application responsive to the second query transmitted to the third-party server;

parsing, by the data processing system, the plurality of responses to generate a keyword based on the plurality of responses;

executing, by the data processing system, responsive to generation of the keyword, a real-time content selection process with the keyword generated based on the plurality of responses intercepted from the application;

identifying, by the data processing system, based on the real-time content selection process, a digital component provided by a content provider device;

executing, by the data processing system, a deduplication process with the digital component and the plurality of responses generated by the application;

determining, by the data processing system, responsive to the deduplication process executed with the digital component and the plurality of responses generated by the application, to add the digital component to the plurality of responses;

retrieving, by the data processing system, for the application, a graphical user interface template defining a font, color, and a layout to render the plurality of responses;

constructing, by the data processing system, a display output using the graphical user interface template that integrates the plurality of responses generated by the application with the digital component identified based on the real-time content selection process; and providing, by the data processing system, the display output to the computing device to cause the computing device to render the display output for display via a display device communicatively coupled to the computing device.

13. The method of claim 12, comprising:

modifying at least one of the font and the color of the digital component to integrate the digital component with the plurality of responses for the display output.

14. The method of claim 12, wherein the application comprises a third-party chatbot provided by the third-party server.

15. The method of claim 12, comprising:

selecting a position among the plurality of responses; and adding the digital component to the position among the plurality of responses to construct the display output.

16. The method of claim 12, comprising:
selecting, based on a machine learning model generated with historical performance data collected from a plurality of instances of the application, a position among the plurality of responses; and
adding the digital component to the position among the plurality of responses to construct the display output.

17. The method of claim 12, comprising:
parsing each of the plurality of responses using a semantic analysis technique to identify the keyword.

18. The method of claim 12, comprising:
generating a tuple formed from the application identifier and an identifier of the computing device; and
selecting the graphical user interface template based on the tuple formed from the application identifier and an identifier of the computing device.

19. A digital assistant device, comprising:
a display device;
a graphics driver;
a sensor to detect an input audio signal; and
a pre-processor component coupled to the display device, the graphics driver, and the sensor, the pre-processor component to:
 filter the input audio signal to create a filtered input audio signal;
 convert the filtered input audio signal to data packets;
 transmit the data packets to a data processing system comprising one or more processors and memory that execute a natural language processor component, an interface, an output merger component, and a content selector component, the data processing system to:
 receive, via the interface, data packets comprising the input audio signal detected by the sensor of the computing device;
 determine, from the input audio signal, an application identifier and a first query;
 generate a second query based on the first query and information associated with the computing device;
 provide the second query to a third-party server that provides an application corresponding to the application identifier to cause the application to identify a plurality of responses to the second query for display via the computing device;
 obtain, prior to display on the computing device and from the application, the plurality of responses identified by the application responsive to the second query transmitted to the third-party server;
 parse the plurality of responses to generate a keyword based on the plurality of responses;
 execute, responsive to generation of the keyword, a real-time content selection process with the keyword generated based on the plurality of responses intercepted from the application;
 identify, based on the real-time content selection process, a digital component provided by a content provider device;
 execute a deduplication process with the digital component and the plurality of responses generated by the application;
 determine, responsive to the deduplication process executed with the digital component and the plurality of responses generated by the application, to add the digital component to the plurality of responses;
 retrieve, for the application, a graphical user interface template defining a font, color, and layout to render the plurality of responses;
 construct a display output using the graphical user interface template that integrates the plurality of responses generated by the application with the digital component identified based on the real-time content selection process; and
 provide the display output to the digital assistant device to cause the digital assistant device to render the display output for display via the display device communicatively coupled to the digital assistant device; and
the graphics driver to render the display output to cause the display device to present a visual indication corresponding to the display output.

20. The device of claim 19, comprising:
an audio driver;
a speaker component; and
the pre-processor component to receive an indication of the display output and instruct the audio driver to generate an output audio signal to cause the speaker component to transmit an audio output corresponding to the indication of the display output.

* * * * *